(12) United States Patent
Nakamori et al.

(10) Patent No.: US 9,916,642 B2
(45) Date of Patent: Mar. 13, 2018

(54) IMAGE PROCESSOR

(71) Applicant: MegaChips Corporation, Osaka-shi (JP)

(72) Inventors: Hiroki Nakamori, Osaka (JP); Takuya Sawada, Osaka (JP); Hideki Daian, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 15/388,959

(22) Filed: Dec. 22, 2016

(65) Prior Publication Data
US 2017/0103501 A1  Apr. 13, 2017

Related U.S. Application Data

(63) Continuation of application No. 14/636,794, filed on Mar. 3, 2015, now Pat. No. 9,552,628.

(30) Foreign Application Priority Data

Mar. 12, 2014 (JP) ................. 2014-049505
Mar. 12, 2014 (JP) ................. 2014-049506
Mar. 12, 2014 (JP) ................. 2014-049507

(51) Int. Cl.
*G06K 9/40* (2006.01)
*G06T 5/00* (2006.01)

(52) U.S. Cl.
CPC .... *G06T 5/002* (2013.01); *G06T 2207/10004* (2013.01); *G06T 2207/20012* (2013.01); *G06T 2207/20021* (2013.01); *G06T 2207/20192* (2013.01)

(58) Field of Classification Search
USPC ............ 382/275, 254, 248, 251; 375/240.15, 375/240.24; 713/176
See application file for complete search history.

(56) References Cited

U.S. PATENT DOCUMENTS

| 5,825,419 | A  | * | 10/1998 | Mishima ................. H04N 19/61 |
| | | | | 375/240.15 |
| 7,397,935 | B2 | | 7/2008 | Kimmel ......................... 382/128 |
| 7,707,422 | B2 | * | 4/2010 | Shin ................... H04N 1/32154 |
| | | | | 713/176 |
| 7,773,792 | B2 | | 8/2010 | Kimmel ......................... 382/128 |
| 8,929,672 | B2 | * | 1/2015 | Cieslinski ............... G06T 9/004 |
| | | | | 382/232 |

FOREIGN PATENT DOCUMENTS

| JP | 5-63989 A | 3/1993 |
| JP | 6-38189 A | 2/1994 |
| JP | 9-233369 | 9/1997 |
| JP | 2006-14164 | 1/2006 |

OTHER PUBLICATIONS

Office Action dated Dec. 6, 2017 in Japanese Patent Application No. 2014-049506 (with English translation).

* cited by examiner

*Primary Examiner* — Anh H Do
(74) *Attorney, Agent, or Firm* — Oblon, McClelland, Maier & Neustadt, L.L.P.

(57) ABSTRACT

A setting circuit sets a quantization value per input image on the basis of a noise value of the whole input image, and a quantization circuit performs quantization on first image data to generate second image data. Quantization value based on the noise value the whole input image can realize appropriate denoising depending on the noise level of the whole input image.

17 Claims, 17 Drawing Sheets

| 20864 | 448 | 71 | 400 | 280 | 535 | 638 | 188 |
|---|---|---|---|---|---|---|---|
| 1138 | 483 | 446 | 290 | 191 | 249 | 287 | 212 |
| 396 | 325 | 172 | 642 | 137 | 90 | 607 | 768 |
| 138 | 1043 | 268 | 85 | 319 | 220 | 157 | 331 |
| 340 | 306 | 471 | 840 | 360 | 1399 | 556 | 958 |
| 828 | 3 | 1164 | 842 | 274 | 655 | 446 | 786 |
| 42 | 509 | 250 | 314 | 289 | 118 | 237 | 202 |
| 402 | 191 | 430 | 129 | 66 | 210 | 811 | 395 |

| 53196 | 4147 | 1293 | 1791 | 842 | 2279 | 495 | 401 |
|---|---|---|---|---|---|---|---|
| 6839 | 4942 | 2283 | 4049 | 715 | 1589 | 876 | 1457 |
| 631 | 3498 | 581 | 1847 | 2186 | 1250 | 806 | 80 |
| 1035 | 1198 | 5400 | 6603 | 821 | 149 | 767 | 102 |
| 378 | 3771 | 657 | 3717 | 1876 | 1543 | 315 | 77 |
| 1768 | 3531 | 1863 | 1088 | 1588 | 2491 | 664 | 449 |
| 1574 | 1344 | 450 | 532 | 522 | 291 | 424 | 1631 |
| 209 | 1199 | 897 | 1269 | 1494 | 834 | 1411 | 1098 |

| 20864 | 1626 | 507 | 702 | 330 | 894 | 194 | 157 |
|---|---|---|---|---|---|---|---|
| 2682 | 1938 | 895 | 1588 | 280 | 623 | 344 | 571 |
| 247 | 1371 | 228 | 724 | 857 | 490 | 316 | 31 |
| 406 | 470 | 2118 | 2590 | 322 | 58 | 301 | 40 |
| 148 | 1479 | 258 | 1458 | 736 | 605 | 124 | 30 |
| 693 | 1385 | 731 | 427 | 623 | 977 | 260 | 176 |
| 617 | 527 | 176 | 209 | 205 | 114 | 166 | 640 |
| 82 | 470 | 352 | 498 | 586 | 327 | 553 | 431 |

FIG. 7

SM(PIC)

| 16 | 4 | 2 | 9 | 14 | 10 | 53 | 19 |
|---|---|---|---|---|---|---|---|
| 7 | 4 | 8 | 3 | 11 | 6 | 13 | 6 |
| 26 | 4 | 12 | 14 | 3 | 3 | 31 | 255 |
| 5 | 36 | 2 | 1 | 16 | 60 | 8 | 132 |
| 37 | 3 | 29 | 9 | 8 | 37 | 72 | 255 |
| 19 | 1 | 25 | 32 | 7 | 11 | 27 | 71 |
| 1 | 15 | 23 | 24 | 23 | 17 | 23 | 5 |
| 78 | 6 | 20 | 4 | 2 | 10 | 23 | 15 |

FIG. 8

| Coefficient | Multiplier |
|---:|---:|
| 1 | 16 |
| 2 | 8 |
| 3 | 5.333333 |
| 4 | 4 |
| 5 | 3.2 |
| 6 | 2.666667 |
| 7 | 2.285714 |
| 8 | 2 |
| 9 | 1.777778 |
| 10 | 1.6 |
| 11 | 1.454545 |
| 12 | 1.333333 |
| 13 | 1.230769 |
| 14 | 1.142857 |
| 15 | 1.066667 |
| 16 | 1 |

| Coefficient | Multiplier |
|---:|---:|
| 32 | 0.5 |
| 48 | 0.333333 |
| 64 | 0.25 |
| 80 | 0.2 |
| 96 | 0.166667 |
| 112 | 0.142857 |
| 128 | 0.125 |
| 144 | 0.111111 |
| 160 | 0.1 |
| 176 | 0.090909 |
| 192 | 0.083333 |
| 208 | 0.076923 |
| 224 | 0.071429 |
| 240 | 0.066667 |
| 255 | 0.062745 |

| 16 | 16 | 16 | 16 | 255 | 255 | 255 | 255 |
|---|---|---|---|---|---|---|---|
| 16 | 16 | 16 | 16 | 255 | 255 | 255 | 255 |
| 16 | 16 | 16 | 16 | 255 | 255 | 255 | 255 |
| 16 | 16 | 16 | 16 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |

SM(MB)

| 16 | 4 | 2 | 9 | 255 | 255 | 255 | 255 |
|---|---|---|---|---|---|---|---|
| 7 | 4 | 8 | 3 | 255 | 255 | 255 | 255 |
| 26 | 4 | 12 | 14 | 255 | 255 | 255 | 255 |
| 5 | 36 | 2 | 1 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |

| 16 | 16 | 16 | 16 | 16 | 16 | 255 | 255 |
|----|----|----|----|----|----|-----|-----|
| 16 | 16 | 16 | 16 | 16 | 16 | 255 | 255 |
| 16 | 16 | 16 | 16 | 16 | 16 | 255 | 255 |
| 16 | 16 | 16 | 16 | 16 | 16 | 255 | 255 |
| 16 | 16 | 16 | 16 | 16 | 16 | 255 | 255 |
| 16 | 16 | 16 | 16 | 16 | 16 | 255 | 255 |
| 255 | 255 | 255 | 255 | 255 | 255 | 255 | 255 |
| 255 | 255 | 255 | 255 | 255 | 255 | 255 | 255 |

SM(MB)

| 16 | 4 | 2 | 9 | 14 | 10 | 255 | 255 |
|----|---|---|---|----|----|-----|-----|
| 7 | 4 | 8 | 3 | 11 | 6 | 255 | 255 |
| 26 | 4 | 12 | 14 | 3 | 3 | 255 | 255 |
| 5 | 36 | 2 | 1 | 16 | 60 | 255 | 255 |
| 37 | 3 | 29 | 9 | 8 | 37 | 255 | 255 |
| 19 | 1 | 25 | 32 | 7 | 11 | 255 | 255 |
| 255 | 255 | 255 | 255 | 255 | 255 | 255 | 255 |
| 255 | 255 | 255 | 255 | 255 | 255 | 255 | 255 |

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

SM(MB)

| 16 | 4  | 2  | 9  | 14 | 10 | 53 | 19  |
|----|----|----|----|----|----|----|-----|
| 7  | 4  | 8  | 3  | 11 | 6  | 13 | 6   |
| 26 | 4  | 12 | 14 | 3  | 3  | 31 | 255 |
| 5  | 36 | 2  | 1  | 16 | 60 | 8  | 132 |
| 37 | 3  | 29 | 9  | 8  | 37 | 72 | 255 |
| 19 | 1  | 25 | 32 | 7  | 11 | 27 | 71  |
| 1  | 15 | 23 | 24 | 23 | 17 | 23 | 5   |
| 78 | 6  | 20 | 4  | 2  | 10 | 23 | 15  |

IMAGE PROCESSOR

CROSS REFERENCE TO RELATED APPLICATIONS

This application is a continuation of U.S. application Ser. No. 14/636,794, filed on Mar. 3, 2015, which claims priority from Japanese Patent Application Numbers 2014-049505, 2014-049506, and 2014-049507, each filed on Mar. 12, 2014. The disclosures of the applications referenced above are incorporated herein by reference herein in their entireties.

BACKGROUND

Technical Field

The present disclosure relates to image processors and image processing methods, and more particularly, to denoising devices and denoising methods for removing noise from an input image to generate an output image.

Related Art

Denoising devices in general remove noise from image data of an input image in a spatial region by uniformly applying a spatial filter such as a lowpass filter to remove a high-frequency component on the whole image.

JPH9-233369A describes a denoising device that applies a median filter around boundaries in an input image while applying a mean filter to other portions.

SUMMARY

In some embodiments, an image processor performs denoising on an input image to generate an output image. The image processor includes a transform circuit that transforms first image data of a spatial region extracted from the input image in a unit of a predetermined block into second image data of a frequency region including multiple frequency components, a quantization circuit that performs quantization on the second image data to generate third image data, an arithmetic circuit that calculates a per-block activity evaluation value based on the first image data, and a quantization value setting circuit that sets a per-block quantization value for quantization based on the per-block activity evaluation value.

In some embodiments, an image processor performs denoising on an input image to generate an output image. The image processor includes a transform circuit that transforms first image data of a spatial region extracted from the input image in a unit of a predetermined block into second image data of a frequency region including multiple frequency components, a quantization circuit that performs quantization on the second image data to generate third image data, a first arithmetic circuit that calculates a per-block noise value based on the first image data, and a quantization value setting circuit that sets a per-block quantization value for quantization based on the per-block noise value.

These and other objects, features, aspects and advantages of the present disclosure will become more apparent from the following detailed description when taken in conjunction with the accompanying drawings.

BRIEF DESCRIPTION OF THE DRAWINGS

FIG. 4 is a diagram for illustrating setting of a scaling matrix by a setting circuit.

FIG. 5 is a diagram for illustrating setting of the scaling matrix by the setting circuit.

FIG. 6 is a diagram for illustrating setting of the scaling matrix by the setting circuit.

FIG. 7 is a diagram for illustrating setting of the scaling matrix by the setting circuit.

FIG. 8 is a diagram for illustrating setting of the scaling matrix by the setting circuit.

FIG. 13 is a diagram for illustrating setting of the scaling matrix by the setting circuit.

FIG. 14 is a diagram for illustrating setting of the scaling matrix by the setting circuit.

FIG. 15 is a diagram for illustrating setting of the scaling matrix by the setting circuit.

DETAILED DESCRIPTION

Figure 1:
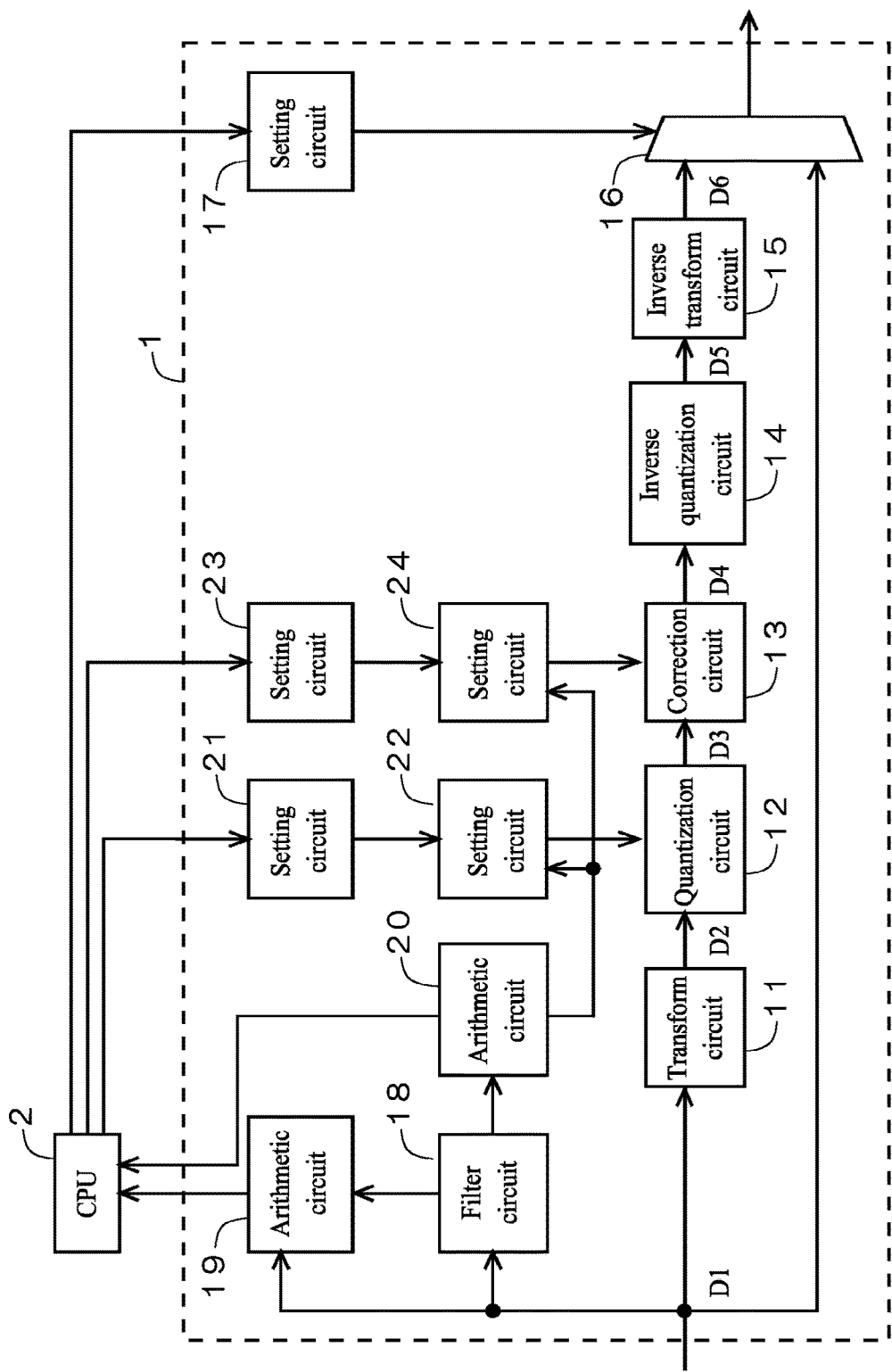
FIG. 1 is a diagram illustrating a configuration of an image processor according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

According to the above-described general denoising devices, applying a spatial filter only once to an input image produces only low denoising effect. Applying a spatial filter multiple times would enhance denoising effect, but then there will be a decrease in resolution, which may cause boundaries to blur, making the whole image rather degraded in image quality. Furthermore, applying a spatial filter multiple times results in prolonged processing time, and in increased circuit size with the need for a temporal memory for storing intermediate values.

The present disclosure is directed to obtaining an image processor and an image processing method that realizes high denoising effect while avoiding image degradation and achieves reduction in processing time and circuit size.

An image processor according to an aspect of the present disclosure is configured to perform denoising on an input image to generate an output image. The image processor includes a transform circuit configured to transform first image data of a spatial region extracted from the input image in a unit of a predetermined block into second image data of a frequency region including a plurality of frequency components, a quantization circuit configured to perform quantization on the second image data to generate third image data, a first arithmetic circuit configured to calculate a per-block noise value based on the first image data, and a first quantization value setting circuit configured to set a first quantization value per input image for quantization based on a noise value of the whole input image.

In the image processor, the first quantization value setting circuit sets a first quantization value per input image based on a noise value of the whole input image, and the quantization circuit performs quantization on the second image data to generate third image data. Quantization using the first quantization value based on the noise value of the whole input image realizes appropriate denoising depending on a noise level of the whole input image. In consequence, high denoising effect is realized while image degradation is avoided. In comparison with applying a spatial filter multiple times in an effort to improve denoising effect, processing time is reduced, and with no need for a temporal memory for storing intermediate values, circuit size is also reduced.

In this aspect, a first correction value setting circuit may set the first correction value per input image based on the second image data of the whole input image, and a correction circuit may perform correction per frequency component on the third image data to generate fourth image data. Correction per frequency component using the first correction value based on the second image data of the whole input image realizes appropriate denoising depending on a noise level per frequency component.

In this aspect, the first arithmetic circuit may calculate a sum of absolute difference between a pixel value of each pixel and a smoothing value of each pixel, and calculate an average of the sum of absolute difference in a block as per-block noise value. Thus the first arithmetic circuit appropriately obtains the per-block noise value.

In this aspect, the first quantization value setting circuit may increase a first quantization value with increase in a noise value. When the noise value of the whole input image is large, a large first quantization value achieves high denoising effect by quantization. When the noise value of the whole input image is small, a small first quantization value avoids image degradation due to quantization.

In this aspect, a second quantization value setting circuit may set the per-block second quantization value for quantization based on the first quantization value and a per-block activity evaluation value. The per-block second quantization value based on the first quantization value based on the noise value of the whole input image and the per-block activity evaluation value realizes appropriate denoising on a per block basis depending on the noise level of the whole input image and the attribute of a block. In consequence, since decrease in resolution is effectively avoided, the image quality is improved as a whole.

In this aspect, the second arithmetic circuit may calculate a sum of absolute difference between a smoothing value of each pixel and an average smoothing value in a block and calculate an average of the sum of absolute difference in the block to obtain a per-block activity evaluation value. Thus the second arithmetic circuit appropriately obtains the per-block activity evaluation value.

In this aspect, the second quantization value setting circuit may set the second quantization value to a quantization value larger than the first quantization value for a block having a small activity evaluation value. In a flat portion having a small activity evaluation value where noise is noticeable, a large second quantization value achieves high denoising effect by quantization. The second quantization value setting circuit may set the second quantization value to a quantization value smaller than the first quantization value for a block having a large activity evaluation value. In an edge or texture portion having a large activity evaluation value, a small second quantization value prevents edge or texture portion from blurring due to quantization, and thus improves image quality.

In this aspect, the second quantization value setting circuit may set the per-block second quantization value for quantization based on the first quantization value and a per-block noise value. The per-block second quantization value based on the first quantization value based on the noise value of the whole input image and the per-block noise value realizes appropriate denoising on a per block basis depending on the noise level of the whole input image and the per-block noise level. In consequence, since decrease in resolution is effectively avoided, the image quality is improved as a whole.

In this aspect, the second quantization value setting circuit may increase the second quantization value with increase in a noise value with the first quantization value being an upper limit. For a block having a large noise value, a large second quantization value achieves high denoising effect by quantization. For a block having a small noise value, a small second quantization value avoids image degradation due to quantization. Providing the upper limit at the first quantization value restricts the difference between the maximum and the minimum second quantization value to a certain range, eliminating or reducing "floppiness", and thus the image quality is improved as a whole.

In this aspect, the first correction value setting circuit may set the first correction value to a transform value for transforming each frequency component value in the input image so that a ratio among frequency component values in the input image equals to that in the ideal image including no noise. Such first correction value realizes correction to bring the output image close to the ideal image, and thus improves image quality.

In this aspect, a second correction value setting circuit may set the per-block second correction value for correction based on the first correction value and the per-block activity evaluation value. The per-macroblock second correction value based on the first correction value based on the second image data of the whole input image and the per-block activity evaluation value realizes appropriate correction on a per block basis depending on the frequency component value of the whole input image and the attribute of a block. In consequence, denoising effect per block is improved and thus the image quality is improved as a whole.

In this aspect, the second correction value setting circuit may hold a plurality of different masks depending on the activity evaluation value, the masks containing arbitrary multipliers by frequency components, and perform masking on the first correction value using one of the masks corresponding to the activity evaluation value calculated by the second arithmetic circuit to set the second correction value. In consequence, the second correction value depending on the per-block activity evaluation value is obtained simply and appropriately from the first correction value.

In this aspect, the second correction value setting circuit may set the second correction value for a block having a small activity evaluation value to the first correction value for a low-frequency component, while setting the second correction value to substantially zero for middle- and high-frequency components. In a flat portion having a small activity evaluation value where noise is noticeable, masking to cut off middle- and high-frequency components achieves high denoising effect by correction. The second correction value setting circuit may set the second correction value for a block having a large activity evaluation value to the first correction value for low-, middle-, and high-frequency components. In an edge or texture portion having a large activity evaluation value, masking not to cut off any frequency component realizes correction to sharpen the edge or texture portion, and thus improves image quality. The second correction value setting circuit may set the second correction value for a block having a medium activity evaluation value to the first correction value for low- and middle-frequency components while setting the second correction value to substantially zero for a high-frequency component. In an image portion other than flat, edge, and texture portions, masking to cut off only a high-frequency component achieves moderate denoising effect by correction.

In this aspect, a determination circuit may determine whether denoising is to be performed on the basis of the noise value of the whole input image and the activity evaluation value of the whole input image. Thus since denoising is performed on an input image that truly requires denoising while denoising on an input image that requires no denoising is avoided, power consumption is reduced.

In this aspect, the determination circuit may divide the noise value of the whole input image by the activity evaluation value of the whole input image to calculate a noise strength. Then if the noise strength is lower than a predetermined threshold, denoising may be determined to be unnecessary, while if the noise strength is higher than or equal to the threshold, denoising may be determined to be necessary. Such determination by the determination circuit achieves highly accurate identification of an input image that truly requires denoising.

In this aspect, the transform circuit and the quantization circuit may sequentially process a plurality of partially-overlapping blocks extracted from the input image. Partially overlapping blocks one another eliminates or reduces block noise. For a portion of the output image where a plurality of blocks overlap each other, an optimal value obtained from the plurality of overlapping blocks may be output as image data of the portion of the image. Output of optimal value (for example, average) obtained from a plurality of blocks for overlapping portion realizes high denoising effect while avoiding image degradation.

In this aspect, the transform circuit and the quantization circuit may sequentially process a plurality of partially-overlapping blocks extracted from the input image. Partially overlapping blocks one another eliminates or reduces block noise. For a portion of the output image where a plurality of blocks overlap each other, output data in processing a current block may be used for input data of the portion of the image in processing a subsequent macroblock. Denoising of the same portion of the image is performed practically multiple times in sequentially processing multiple blocks, achieving a shorter processing time, in comparison with in comparison with denoising by obtaining an optimal value from output values of multiple blocks overlap each other.

In this aspect, denoising may be individually performed on each color component. Individual denoising for each color component of the input image achieves optimal denoising effect for each color component.

In this aspect, integrated denoising on a plurality of color components may be performed. Integrated denoising on multiple color components achieves improved accuracy of noise detection. Furthermore, since variation in denoising effect among color components is eliminated or reduced, image quality is improved.

An image processing method according to another aspect of the present disclosure is an image processing method for denoising of an input image to generate an output image. The method includes transforming first image data of a spatial region extracted from the input image in a unit of a predetermined block into second image data of a frequency region including a plurality of frequency components, performing quantization on the second image data to generate third image data, calculating a per-block noise value based on the first image data, and setting a first quantization value per input image for quantization based on a noise value of the whole input image.

In the method, a first quantization value per input image is set on the basis of the noise value of the whole input image, and quantization is performed on second image data to generate third image data. Quantization using the first quantization value based on the noise value of the whole input image realizes appropriate denoising depending on a noise level of the whole input image. In consequence, high denoising effect is realized while image degradation is avoided. In comparison with applying a spatial filter multiple times in an effort to improve denoising effect, processing time is reduced, and with no need for a temporal memory for storing intermediate values, circuit size is also reduced.

An image processor according to another aspect of the present disclosure is configured to perform denoising on an input image to generate an output image. The image processor includes a transform circuit configured to transform first image data of a spatial region extracted from the input image in a unit of a predetermined block into second image data of a frequency region including a plurality of frequency components, a quantization circuit configured to perform quantization on the second image data to generate third image data, an arithmetic circuit configured to calculate a per-block activity evaluation value based on the first image data, and a quantization value setting circuit configured to set a per-block quantization value for quantization based on the per-block activity evaluation value.

In the image processor, the quantization value setting circuit sets a per-block quantization value for quantization based on the per-block activity evaluation value. The per-block quantization value based on the per-block activity evaluation value realizes appropriate denoising on a per block basis depending on the attribute of a block. In consequence, since decrease in resolution is effectively avoided, the image quality is improved as a whole. In comparison with applying a spatial filter multiple times in an effort to improve denoising effect, processing time is reduced, and with no need for a temporal memory for storing intermediate values, circuit size is also reduced.

In this aspect, a correction value setting circuit may set a per-block correction value for correction based on the per-block activity evaluation value. The per-block correction value based on the per-block activity evaluation value realizes appropriate correction on a per block basis depending on the attribute of a block. In consequence, denoising effect per block is improved and thus the image quality is improved as a whole.

In this aspect, the arithmetic circuit may calculate a sum of absolute difference between a smoothing value of each pixel and an average smoothing value in a block and calculate an average of the sum of absolute difference in the block to obtain a per-block activity evaluation value. Thus the arithmetic circuit appropriately obtains the per-block activity evaluation value.

In this aspect, the quantization value setting circuit may set a quantization value of a block having a small activity evaluation value to a large value. In a flat portion having a small activity evaluation value where noise is noticeable, a large quantization value achieves high denoising effect by quantization. The quantization value setting circuit may set a quantization value of a block having a large activity evaluation value to a small value. In an edge or texture portion having a large activity evaluation value, a small quantization value prevents edge or texture portion from blurring due to quantization, and thus improves image quality. The quantization value setting circuit may set a quantization value of a block having a medium activity evaluation value to a medium value. In an image portion other than flat, edge, and texture portions, a medium quantization value avoids excessive or insufficient denoising effect on the image portion.

An image processor according to another aspect of the present disclosure is configured to perform denoising on an input image to generate an output image. The image processor includes a transform circuit configured to transform first image data of a spatial region extracted from the input image in a unit of a predetermined block into second image data of a frequency region including a plurality of frequency components, a quantization circuit configured to perform quantization on the second image data to generate third image data, a first arithmetic circuit configured to calculate a per-block noise value based on the first image data, and a quantization value setting circuit configured to set a per-block quantization value for quantization based on the per-block noise value.

In the image processor, the quantization value setting circuit sets a per-block quantization value for quantization based on the per-block noise value. The per-block quantization value based on the per-block noise value realizes appropriate denoising on a per block basis depending on the noise level per block. In consequence, since decrease in resolution is effectively avoided, the image quality is improved as a whole. In comparison with applying a spatial filter multiple times in an effort to improve denoising effect, processing time is reduced, and with no need for a temporal memory for storing intermediate values, circuit size is also reduced.

In this aspect, a correction value setting circuit may set a per-block correction value for correction based on the per-block activity evaluation value. The per-block correction value based on the per-block activity evaluation value realizes appropriate correction on a per block basis depending on the attribute of a block. In consequence, denoising effect per block is improved and thus the image quality is improved as a whole.

In this aspect, the first arithmetic circuit may calculate a sum of absolute difference between a pixel value of each pixel and a smoothing value of each pixel, and calculate an average of the sum of absolute difference in a block as per-block noise value. Thus the first arithmetic circuit appropriately obtains the per-block noise value.

In this aspect, the quantization value setting circuit may increase the quantization value with increase in a noise value. For a block having a large noise value, a large quantization value achieves high denoising effect by quantization. For a block having a small noise value, a small quantization value avoids image degradation due to quantization.

In this aspect, the second arithmetic circuit may calculate a sum of absolute difference between a smoothing value of each pixel and an average smoothing value in a block and calculate an average of the sum of absolute difference in the block to obtain a per-block activity evaluation value. Thus the second arithmetic circuit appropriately obtains the per-block activity evaluation value.

In this aspect, the correction value setting circuit may hold a plurality of different masks depending on the activity evaluation value, the masks containing arbitrary multipliers by frequency components, and set the correction value to a multiplier for one of the masks corresponding to the activity evaluation value calculate by the second arithmetic circuit. In consequence the correction value depending on the per-block activity evaluation value is obtained simply and appropriately.

In this aspect, the correction value setting circuit may set the correction value for a block having a small activity evaluation value to one time for a low-frequency component and to substantially zero time for middle- and high-frequency components. In a flat portion having a small activity evaluation value where noise is noticeable, masking to cut off middle- and high-frequency components achieves high denoising effect by correction. The correction value setting circuit may set the correction value for a block having a large activity evaluation value to one time for low-, middle-, and high-frequency components. In an edge or texture portion having a large activity evaluation value, masking not to cut off any frequency component realizes correction to sharpen the edge or texture portion, and thus improves image quality. The correction value setting circuit may set the correction value for a block having a medium activity evaluation value to one time for low- and middle-frequency components and to substantially zero time for a high-frequency component. In an image portion other than flat, edge, and texture portions, masking to cut off only a high-frequency component achieves moderate denoising effect by correction.

In this aspect, the determination circuit may determine whether denoising is to be performed on the basis of the noise value of the whole input image and the activity evaluation value of the whole input image. Thus since denoising is performed on an input image that truly requires denoising while denoising on an input image that requires no denoising is avoided, power consumption is reduced.

In this aspect, the determination circuit may divide the noise value of the whole input image by the activity evaluation value of the whole input image to calculate a noise strength. Then if the noise strength is lower than a predetermined threshold, denoising may be determined to be unnecessary, while if the noise strength is higher than or equal to the threshold, denoising may be determined to be necessary. Such determination by the determination circuit achieves highly accurate identification of an input image that truly requires denoising.

In this aspect, the transform circuit and the quantization circuit may sequentially process a plurality of partially-overlapping blocks extracted from the input image. Partially overlapping blocks one another eliminates or reduces block noise. For a portion of the output image where a plurality of blocks overlap each other, an optimal value obtained from the plurality of overlapping blocks may be output as image data of the portion of the image. Output of optimal value (for example, average) obtained from a plurality of blocks for overlapping portion realizes high denoising effect while avoiding image degradation.

In this aspect, the transform circuit and the quantization circuit may sequentially process a plurality of partially-overlapping blocks extracted from the input image. Partially overlapping blocks one another eliminates or reduces block noise. For a portion of the output image where a plurality of blocks overlap each other, output data in processing a current block may be used for input data of the portion of the image in processing a subsequent macroblock. Denoising of the same portion of the image is performed practically multiple times in sequentially processing multiple blocks, achieving a shorter processing time, in comparison with in comparison with denoising by obtaining an optimal value from output values of multiple blocks overlap each other.

In this aspect, denoising may be individually performed on each color component. Individual denoising for each color component of the input image achieves optimal denoising effect for each color component.

In this aspect, integrated denoising on a plurality of color components may be performed. Integrated denoising on multiple color components achieves improved accuracy of noise detection. Furthermore, since variation in denoising effect among color components is eliminated or reduced, image quality is improved.

An image processing method according to another aspect of the present disclosure is an image processing method for denoising of an input image to generate an output image. The method includes transforming first image data of a spatial region extracted from the input image in a unit of a predetermined block into second image data of a frequency region including a plurality of frequency components, performing quantization on the second image data to generate third image data, calculating a per-block activity evaluation value based on the first image data, and setting a per-block quantization value for quantization based on the per-block activity evaluation value.

In the method, a per-block quantization value for quantization is set on the basis of a per-block activity evaluation value. The per-block quantization value based on the per-block activity evaluation value realizes appropriate denoising on a per block basis depending on the attribute of a block. In consequence, since decrease in resolution is effectively avoided, the image quality is improved as a whole. In comparison with applying a spatial filter multiple times in an effort to improve denoising effect, processing time is reduced, and with no need for a temporal memory for storing intermediate values, circuit size is also reduced.

An image processing method according to another aspect of the present disclosure is an image processing method for denoising of an input image to generate an output image. The method includes transforming first image data of a spatial region extracted from the input image in a unit of a predetermined block into second image data of a frequency region including a plurality of frequency components, performing quantization on the second image data to generate third image data, calculating a per-block noise value based on the first image data, and setting a per-block quantization value for quantization based on the per-block noise value.

In the method, a per-block quantization value for quantization may be set on the basis of the per-block noise value. The per-block quantization value based on the per-block noise value realizes appropriate denoising on a per block basis depending on the noise level per block. In consequence, since decrease in resolution is effectively avoided, the image quality is improved as a whole. In comparison with applying a spatial filter multiple times in an effort to improve denoising effect, processing time is reduced, and with no need for a temporal memory for storing intermediate values, circuit size is also reduced.

An image processor according to another aspect of the present disclosure is configured to perform denoising on an input image to output an output image. The image processor includes a transform circuit configured to transform first image data of a spatial region extracted from the input image in a unit of a predetermined block into second image data of a frequency region including a plurality of frequency components, a quantization circuit configured to perform quantization on the second image data to generate third image data, a correction circuit configured to perform correction per frequency component on the third image data to generate fourth image data, and a first correction value setting circuit configured to set a first correction value per input image for correction based on the second image data of the whole input image. The first correction value setting circuit is configured to set the first correction value to a transform value for transforming each frequency component value in the input image so that a ratio among frequency component values in the input image equals to that in an ideal image including no noise.

In the image processor, the first correction value setting circuit may set the first correction value per input image based on the second image data of the whole input image, and the correction circuit may perform correction per frequency component on the third image data to generate fourth image data. Correction per frequency component using the first correction value based on the second image data of the whole input image realizes appropriate denoising depending on a noise level per frequency component. In consequence, high denoising effect is realized while image degradation is avoided. In comparison with applying a spatial filter multiple times in an effort to improve denoising effect, processing time is reduced, and with no need for a temporal memory for storing intermediate values, circuit size is also reduced. The first correction value setting circuit may set the first correction value to the transform value for transforming each frequency component value in the input image so that a ratio among frequency component values in the input image equals to that in the ideal image including no noise. Such first correction value realizes correction to bring the output image close to the ideal image, and thus improves image quality.

In this aspect, the second correction value setting circuit may set the per-block second correction value for correction based on the first correction value and the per-block activity evaluation value. The per-macroblock second correction value based on the first correction value based on the second image data of the whole input image and the per-block activity evaluation value realizes appropriate correction on a per block basis depending on the frequency component value of the whole input image and the attribute of a block. In consequence, denoising effect per block is improved and thus the image quality is improved as a whole.

In this aspect, the second correction value setting circuit may hold a plurality of different masks depending on the activity evaluation value, the masks containing arbitrary multipliers by frequency components, and perform masking on the first correction value using one of the masks corresponding to the activity evaluation value calculated by the arithmetic circuit to set the second correction value. In consequence, the second correction value depending on the per-block activity evaluation value is obtained simply and appropriately from the first correction value.

In this aspect, the second correction value setting circuit may set the second correction value for a block having a small activity evaluation value to the first correction value for a low-frequency component, while setting the second correction value to substantially zero for middle- and high-frequency components. In a flat portion having a small activity evaluation value where noise is noticeable, masking to cut off middle- and high-frequency components achieves high denoising effect by correction. The second correction value setting circuit may set the second correction value for a block having a large activity evaluation value to the first correction value for low-, middle-, and high-frequency components. In an edge or texture portion having a large activity evaluation value, masking not to cut off any frequency component realizes correction to sharpen the edge or texture portion, and thus improves image quality. The second correction value setting circuit may set the second correction value for a block having a medium activity evaluation value to the first correction value for low- and middle-frequency components while setting the second correction value to substantially zero for a high-frequency component. In an image portion other than flat, edge, and texture portions, masking to cut off only a high-frequency component achieves moderate denoising effect by correction.

In this aspect, the arithmetic circuit may calculate a sum of absolute difference between a smoothing value of each pixel and an average smoothing value in a block and calculate an average of the sum of absolute difference in the block to obtain a per-block activity evaluation value. Thus the arithmetic circuit appropriately obtains the per-block activity evaluation value.

An image processor according to another aspect of the present disclosure is configured to perform denoising on an input image to generate an output image. The image processor includes a transform circuit configured to transform first image data of a spatial region extracted from the input image in a unit of a predetermined block into second image data of a frequency region including a plurality of frequency components, a quantization circuit configured to perform quantization on the second image data to generate third image data, a correction circuit configured to perform correction per frequency component on the third image data to generate fourth image data, an arithmetic circuit configured to calculate a per-block activity evaluation value based on the first image data, and a correction value setting circuit configured to set a per-block correction value for correction based on the per-block activity evaluation value. The correction value setting circuit is configured to hold a plurality of different masks depending on the activity evaluation value, the masks containing arbitrary multipliers by frequency components, and set the correction value to a multiplier for one of the masks corresponding to the activity evaluation value calculated by the arithmetic circuit.

In this aspect, the correction value setting circuit sets a per-block correction value for correction based on the per-block activity evaluation value. The per-block correction value based on the per-block activity evaluation value realizes appropriate correction on a per block basis depending on the attribute of a block. In consequence, denoising effect per block is improved and thus the image quality is improved as a whole. In comparison with applying a spatial filter multiple times in an effort to improve denoising effect, processing time is reduced, and with no need for a temporal memory for storing intermediate values, circuit size is also reduced. The correction value setting circuit holds a plurality of different masks depending on the activity evaluation value, the masks containing arbitrary multipliers by frequency components, and sets the correction value to a multiplier for one of the masks corresponding to the activity evaluation value calculated by the arithmetic circuit. In consequence the correction value depending on the per-block activity evaluation value is obtained simply and appropriately.

In this aspect, the correction value setting circuit may set the correction value for a block having a small activity evaluation value to one time for a low-frequency component and to substantially zero time for middle- and high-frequency components. In a flat portion having a small activity evaluation value where noise is noticeable, masking to cut off middle- and high-frequency components achieves high denoising effect by correction. The correction value setting circuit may set the correction value for a block having a large activity evaluation value to one time for low-, middle-, and high-frequency components. In an edge or texture portion having a large activity evaluation value, masking not to cut off any frequency component realizes correction to sharpen the edge or texture portion, and thus improves image quality. The correction value setting circuit may set the correction value for a block having a medium activity evaluation value to one time for low- and middle-frequency components and to substantially zero time for a high-frequency component. In an image portion other than flat, edge, and texture portions, masking to cut off only a high-frequency component achieves moderate denoising effect by correction.

In this aspect, the arithmetic circuit may calculate a sum of absolute difference between a smoothing value of each pixel and an average smoothing value in a block and calculate an average of the sum of absolute difference in the block to obtain a per-block activity evaluation value. Thus the arithmetic circuit appropriately obtains per-block activity evaluation value.

In this aspect, the determination circuit may determine whether denoising is to be performed on the basis of the noise value of the whole input image and the activity evaluation value of the whole input image. Thus since denoising is performed on an input image that truly requires denoising while denoising on an input image that requires no denoising is avoided, power consumption is reduced.

In this aspect, the determination circuit may divide the noise value of the whole input image by the activity evaluation value of the whole input image to calculate a noise strength. Then if the noise strength is lower than a predetermined threshold, denoising may be determined to be unnecessary, while if the noise strength is higher than or equal to the threshold, denoising may be determined to be necessary. Such determination by the determination circuit achieves highly accurate identification of an input image that truly requires denoising.

In this aspect, the transform circuit, the quantization circuit, and the correction circuit may sequentially process a plurality of partially-overlapping blocks extracted from the input image. Partially overlapping blocks one another eliminates or reduces block noise. For a portion of the output image where a plurality of blocks overlap each other, an optimal value obtained from the plurality of overlapping blocks may be output as image data of the portion of the image. Output of optimal value (for example, average) obtained from a plurality of blocks for overlapping portion realizes high denoising effect while avoiding image degradation.

In this aspect, the transform circuit, the quantization circuit, and the correction circuit may sequentially process a plurality of partially-overlapping blocks extracted from the input image. Partially overlapping blocks one another eliminates or reduces block noise. For a portion of the output image where a plurality of blocks overlap each other, output data in processing a current block may be used for input data of the portion of the image in processing a subsequent macroblock. Denoising of the same portion of the image is performed practically multiple times in sequentially processing multiple blocks, achieving a shorter processing time, in comparison with in comparison with denoising by obtaining an optimal value from output values of multiple blocks overlap each other.

In this aspect, denoising may be individually performed on each color component. Individual denoising for each color component of the input image achieves optimal denoising effect for each color component.

In this aspect, integrated denoising on a plurality of color components may be performed. Integrated denoising on multiple color components achieves improved accuracy of noise detection. Furthermore, since variation in denoising effect among color components is eliminated or reduced, image quality is improved.

An image processing method according to another aspect of the present disclosure is an image processing method for denoising of an input image to output an output image. The method includes transforming first image data of a spatial region extracted from the input image in a unit of a predetermined block into second image data of a frequency region including a plurality of frequency components, performing quantization on the second image data to generate third image data, performing correction per frequency component on the third image data to generate fourth image data, and setting a first correction value per input image for correction based on the second image data of the whole input image. The setting of the first correction value includes setting the first correction value to a transform value for transforming each frequency component value in the input image so that a ratio among frequency component values in the input image equals to that in an ideal image including no noise.

In the image processing method, the setting of the first correction value includes setting the first correction value per input image based on the second image data of the whole input image, and the performing correction on the third image data includes performing correction per frequency component on the third image data to generate fourth image data. Correction per frequency component using the first correction value based on the second image data of the whole input image realizes appropriate denoising depending on a noise level per frequency component. In consequence, high denoising effect is realized while image degradation is avoided. In comparison with applying a spatial filter multiple times in an effort to improve denoising effect, processing time is reduced, and with no need for a temporal memory for storing intermediate values, circuit size is also reduced. The setting of the first correction value further includes setting the first correction value to a transform value for transforming each frequency component value in the input image so that a ratio among frequency component values in the input image equals to that in an ideal image including no noise. Such first correction value realizes correction to bring the output image close to the ideal image, and thus improves image quality.

An image processing method according to another aspect of the present disclosure is an image processing method for denoising of an input image to generate an output image. The method includes transforming first image data of a spatial region extracted from the input image in a unit of a predetermined block into second image data of a frequency region including a plurality of frequency components, performing quantization on the second image data to generate third image data, performing correction per frequency component on the third image data to generate fourth image data, calculating a per-block activity evaluation value based on the first image data, and setting a per-block correction value for correction based on the per-block activity evaluation value. The setting of the correction value includes holding a plurality of different masks depending on the activity evaluation value, the masks containing arbitrary multipliers by frequency components, and setting the correction value to a multiplier for one of the masks corresponding to the activity evaluation value calculate in the calculating of the per-block activity evaluation value.

The image processing method includes setting a per-block correction value for correction based on the per-block activity evaluation value. The per-block correction value based on the per-block activity evaluation value realizes appropriate correction on a per block basis depending on the attribute of a block. In consequence, denoising effect per block is improved and thus the image quality is improved as a whole. In comparison with applying a spatial filter multiple times in an effort to improve denoising effect, processing time is reduced, and with no need for a temporal memory for storing intermediate values, circuit size is also reduced. The method includes holding a plurality of different masks depending on the activity evaluation value, the masks containing arbitrary multipliers by frequency components, and setting the correction value to a multiplier for one of the masks corresponding to the activity evaluation value calculate in the calculating of the per-block activity evaluation value. In consequence the correction value depending on the per-block activity evaluation value is obtained simply and appropriately.

Some embodiments of the present disclosure provide an image processor and an image processing method that realize high denoising effect while avoiding image degradation and achieve reduction in processing time and circuit size.

DESCRIPTION OF EMBODIMENTS

Embodiments of the present disclosure are described in detail below referring to the drawings. It should be noted that identical reference numerals throughout the drawings indicate identical or equivalent elements.

FIG. 1 is a diagram illustrating a configuration of an image processor 1 according to an embodiment of the present disclosure. The image processor 1 receives an input image including R, Gr, Gb, and B color components in Bayer array sorted by color components. The image processor 1 performs denoising individually on the input image of each color component, so as to generate and output an output image. Color components of the input image are not limited to R, Gr, Gb, and B but may be R, G, and, B, Y, U, and V, or the like.

FIG. 1 illustrates a relation of connection of the image processor 1 including a transform circuit 11, a quantization circuit 12, a correction circuit 13, an inverse quantization circuit 14, an inverse transform circuit 15, a selector 16, a setting circuit 17, a filter circuit 18, arithmetic circuits 19 and 20, and setting circuits 21 to 24.

The transform circuit 11 transforms image data D1 of a spatial region extracted from an input image in a unit of a predetermined block (in this example, macroblock by macroblock, each macroblock having 8 rows×8 columns) into image data D2 of a frequency region including multiple frequency components by DCT transform. The block size is not limited to 8 rows×8 columns but may be, for example, 16 rows×16 columns. With a bigger block size, the circuit size increases, but the image quality is improved with finer control over frequency components.

The quantization circuit 12 performs quantization on image data D2 to generate image data D3.

The correction circuit 13 performs correction per frequency component on the image data D3 to generate image data D4.

The inverse quantization circuit 14 performs inverse quantization on the image data D4 to generate image data D5.

The inverse transform circuit 15 transforms the image data D5 of a frequency region into image data D6 of a spatial region by inverse DCT transform.

The selector 16 selects and outputs the image data D1 or the image data D6.

A CPU 2 determines whether denoising is to be performed, on the basis of a noise value of the whole input image NOISE(PIC) and an activity evaluation value of the whole input image ACT(PIC). A result of the determination is configured in the setting circuit 17. The setting circuit 17 causes the selector 16 to select the image data D6 if denoising is necessary, while causing the selector 16 to select the image data D1 if denoising is unnecessary.

The filter circuit 18 is an arbitrary smoothing filter (in this example, the Gaussian filter having 3 rows×3 columns), which calculates a weighted mean GAUS (i, j) of each pixel, on the basis of a pixel value of each pixel and pixel values of multiple adjacent pixels (eight pixels for 3 rows×3 columns).

The arithmetic circuit 19 calculates a per-macroblock noise value NOISE(MB), on the basis of the image data D1 and the image data D1 processed by the filter circuit 18 with a weighted mean. The arithmetic circuit 19 also calculates an average of noise values NOISE(MB) of all macroblocks in the input image which serves as a noise value NOISE(PIC). The noise value NOISE(PIC) may be calculated by inputting a sum of the noise values NOISE(MB) of all macroblocks in the input image from the arithmetic circuit 19 to the CPU 2 and dividing the sum by the number of macroblocks in the CPU 2.

The arithmetic circuit 20 calculates a per-macroblock activity evaluation value ACT(MB), on the basis of the image data D1 processed by the filter circuit 18 with a weighted mean. The arithmetic circuit 20 also calculates an average of activity evaluation values ACT(MB) of all macroblocks in the input image which serves as an activity evaluation value ACT(PIC). The activity evaluation value ACT(PIC) may be calculated by inputting a sum of the activity evaluation values ACT(MB) of all macroblocks in the input image from the arithmetic circuit 20 to the CPU 2 and dividing the sum by the number of macroblocks in the CPU 2.

The setting circuit 21 sets a quantization value QP(PIC) per input image for quantization by the quantization circuit 12, on the basis of the noise value NOISE(PIC).

The setting circuit 22 sets a per-macroblock quantization value QP(MB) for quantization by the quantization circuit 12, on the basis of an internal parameter of the image processor 1 (for example, the quantization value QP(PIC), the activity evaluation value ACT(MB), and the noise value NOISE(MB)).

The setting circuit 23 sets a scaling matrix SM(PIC) that contains a correction value per input image for correction by the correction circuit 13, on the basis of the image data D2 of the whole input image.

The setting circuit 24 sets a scaling matrix SM(MB) that contains a per-macroblock correction value for correction by the correction circuit 13, on the basis of an internal parameter of the image processor 1 (for example, the scaling matrix SM(PIC), the activity evaluation value ACT(MB), the noise value NOISE(PIC), and the activity evaluation value ACT(PIC)).

Figure 2:
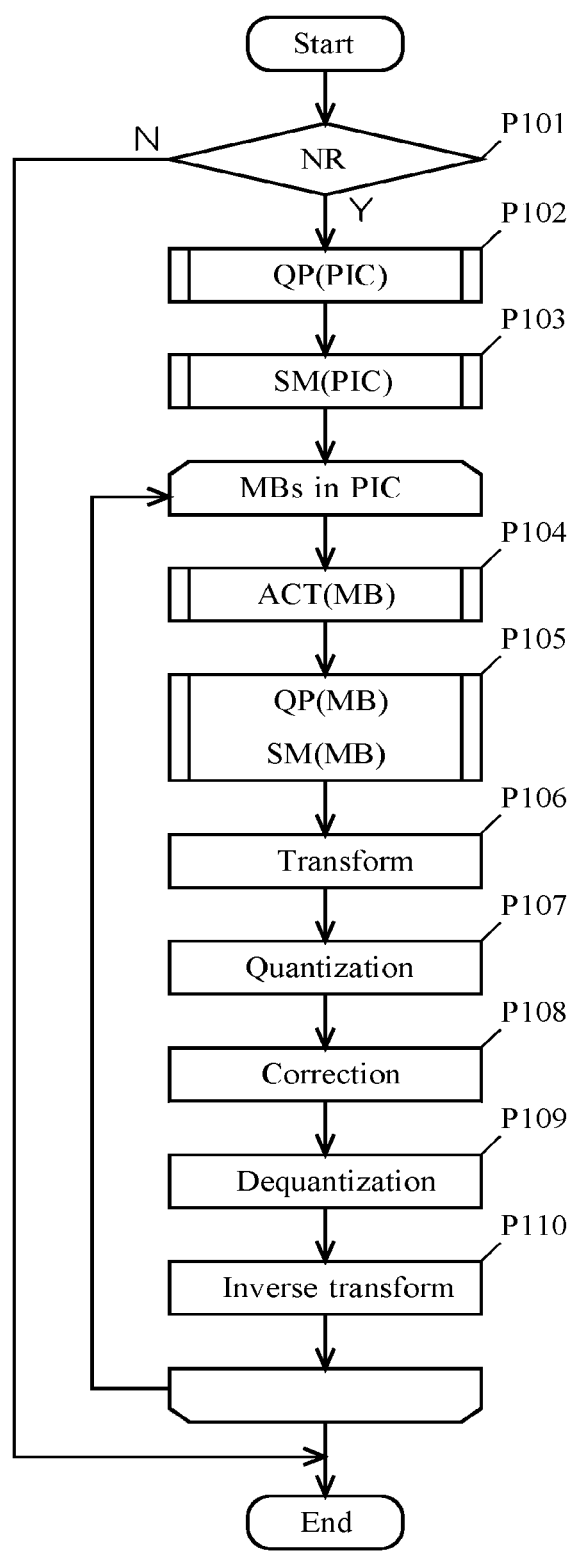
FIG. 2 is a flow chart illustrating the sequence of denoising by the image processor.

FIG. 2 is a flow chart illustrating the sequence of denoising by the image processor 1. Firstly in Step P101, the setting circuit 17 sets the selector 16, in accordance with determination by the CPU 2 as to whether denoising is to be performed. If denoising is unnecessary, processing ends.

If denoising is necessary, in Step P102, the setting circuit 21 sets the quantization value QP(PIC).

In Step P103, the setting circuit 23 set the scaling matrix SM(PIC).

In Steps P104 to P110, per-macroblock denoising is repeated for all macroblocks in the input image.

In Step P104, the arithmetic circuit 20 calculates the activity evaluation value ACT(MB).

In Step P105, the setting circuit 22 sets the quantization value QP(MB). The setting circuit 24 also sets the scaling matrix SM(MB).

In Step P106, the transform circuit 11 transforms the image data D1 into the image data D2.

In Step P107, the quantization circuit 12 performs quantization using the quantization value QP(MB) on the image data D2 to generate the image data D3.

In Step P108, the correction circuit 13 performs correction using the scaling matrix SM(MB) on the image data D3 to generate the image data D4.

In Step P109, the inverse quantization circuit 14 performs inverse quantization on the image data D4 to generate the image data D5.

In Step P110, the inverse transform circuit 15 transforms the image data D5 into the image data D6 by inverse DCT transform. Processing ends with completion of per-macroblock denoising for all macroblocks in the input image.

Description is given of details of processing by each processing unit illustrated in FIG. 1.

<Calculation of GAUS (i,j)>

The filter circuit 18 calculates a weighted mean GAUS (i, j) of each pixel given by Equation 1, where CURR (i, j) is a pixel value of each pixel in a macroblock:

Equation 1

$$GAUS(i, j) = CURR(i, j) * \begin{bmatrix} 1 & 2 & 1 \\ 2 & 4 & 2 \\ 1 & 2 & 1 \end{bmatrix} // 16 \quad (1)$$

<Calculation of NOISE(MB)>

The arithmetic circuit 19 calculates a sum of absolute difference between the pixel value CURR (i, j) of each pixel and the weighted mean GAUS (i, j) of each pixel given by Equation 2. Then the arithmetic circuit 19 calculates an average of the sum of absolute difference in the macroblock given by Equation 3, which serves as the per-macroblock noise value NOISE(MB).

Equation 2

$$\text{diff\_8} \times 8blk = \sum_{j=0}^{7} \sum_{i=0}^{7} |CURR(i, j) - GAUS(i, j)| \quad (2)$$

Equation 3

$$\text{NOISE}(MB) = \text{diff}\_8 \times 8blk \, // \, 64 \quad (3)$$

<Setting of QP(PIC)>

Figure 3:
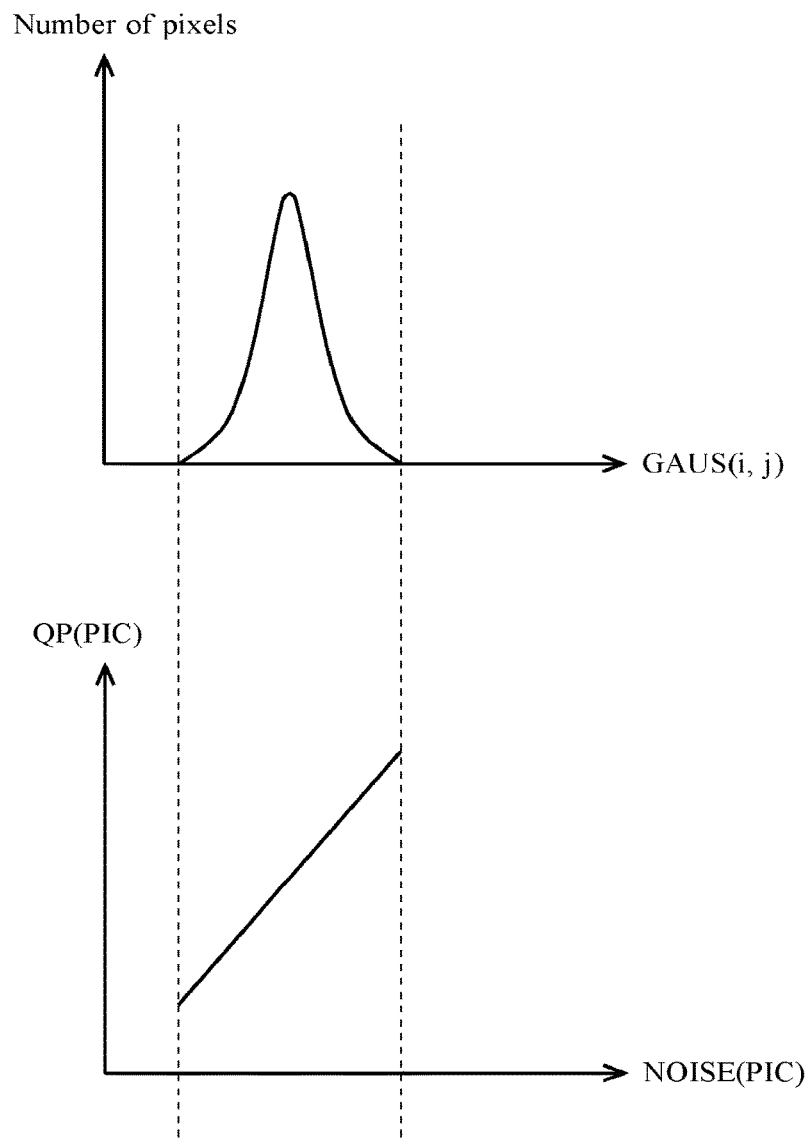
FIG. 3 is a diagram for illustrating setting of a quantization value by a setting circuit.

FIG. 3 is a diagram for illustrating setting of the quantization value QP(PIC) by the setting circuit 21. The arithmetic circuit 19 calculates an average of noise values NOISE(MB) of all macroblocks in the input image, which serves as the noise value NOISE(PIC). The setting circuit 21 holds a look-up table containing an optimal quantization value QP(PIC) for each noise value NOISE(PIC). The setting circuit 21 normalizes the look-up table in the distribution range of the weighted means GAUS (i, j) in the histogram of the weighted means GAUS (i, j) and the number of pixels. Then the setting circuit 21 uses the normalized look-up table to set the quantization value QP(PIC) of the input image to the quantization value corresponding to the noise value NOISE(PIC). As illustrated in FIG. 3, the setting circuit 21 increases the quantization value QP(PIC) with increase in the noise value NOISE(PIC).

<Setting of SM(PIC)>

FIGS. 4 to 8 are diagrams for illustrating setting of the scaling matrix SM(PIC) by the setting circuit 23. The setting circuit 23 firstly obtains the quantization value QP(PIC) in the same method as the setting circuit 21.

The setting circuit 23 then acquires image data D3 on which DCT transform and quantization with the quantization value QP(PIC) have been performed, for all macroblocks in the input image. Absolute values of frequency component values of all macroblocks are accumulated for each frequency component in the image data D3 to obtain a sum of absolute difference K1 of each frequency component value of the input image. An example of the sum of absolute difference K1 is illustrated in FIG. 4. The frequency component value at the top-left corner as oriented in the figure corresponds to a DC component, and the frequency component value at the bottom-right corner corresponds to a component having the highest frequency.

The setting circuit 23 acquires the image data D2 on which DCT transform has been performed, for all macroblocks in an ideal image prepared in advance. The ideal image is an image that includes no noise in which a subject is shot in the same composition as the input image. For example, when the image processor 1 is used for a security camera, the input image is an image with much noise shot under low illumination such as at nighttime, while the ideal image is an image with little noise shot under high illumination such as at daytime. The setting circuit 23 accumulates absolute values of frequency component values of all macroblocks for each frequency component in the image data D2 to obtain a sum of absolute difference K2 of each frequency component value of the ideal image. An example of the sum of absolute difference K2 is illustrated in FIG. 5.

The setting circuit 23 then normalizes each frequency component value of the sum of absolute difference K2 to have the frequency component value of the DC component of the sum of absolute difference K2 equal to that of the sum of absolute difference K1, so as to produce a normalized sum of absolute difference K3. An example of the sum of absolute difference K3 is illustrated in FIG. 6.

The setting circuit 23 then calculates a transform value (multiplier) for transforming the sum of absolute difference K1 of each frequency component value so that each frequency component value of the sum of absolute difference K1 equals to (or approaches) each frequency component value of the sum of absolute difference K3. In other words, the setting circuit 23 sets the correction value to the transform value for transforming each frequency component value in the input image so that a ratio of each frequency component value to the DC component in the input image equals to that in the ideal image.

The setting circuit 23 then employs predetermined coefficients for substituting for the multipliers of the frequency components to produce the scaling matrix SM(PIC). An example of the scaling matrix SM(PIC) is illustrated in FIG. 7. An example of a correspondence between coefficients and multipliers is illustrated in FIG. 8. In the scaling matrix SM(PIC), the coefficient "16" corresponds to the multiplier "1" (that is, passed through) and the coefficient "255" corresponds to the smallest multiplier being substantially zero (that is, cut off).

If the ideal image is not available, the coefficient "16" is employed for all frequency components, so as to produce the scaling matrix SM(PIC) that causes the correction circuit 13 to practically serve as a through filter. Alternatively, the scaling matrix SM(PIC) for general-purpose use may be prepared in advance, and such scaling matrix SM(PIC) may be used if the ideal image is not available.

<Overlapping>

In the image processor 1, overlapping of macroblocks is performed on a macroblock having 8 rows×8 columns with a subsequent macroblock extracted from a position shifted by four pixels serving as the image data D1. The number of pixels for the shift is not limited to four, but may be an arbitrary number. With a shift by fewer pixels, processing time elongates, but the image quality is improved.

Figure 9:
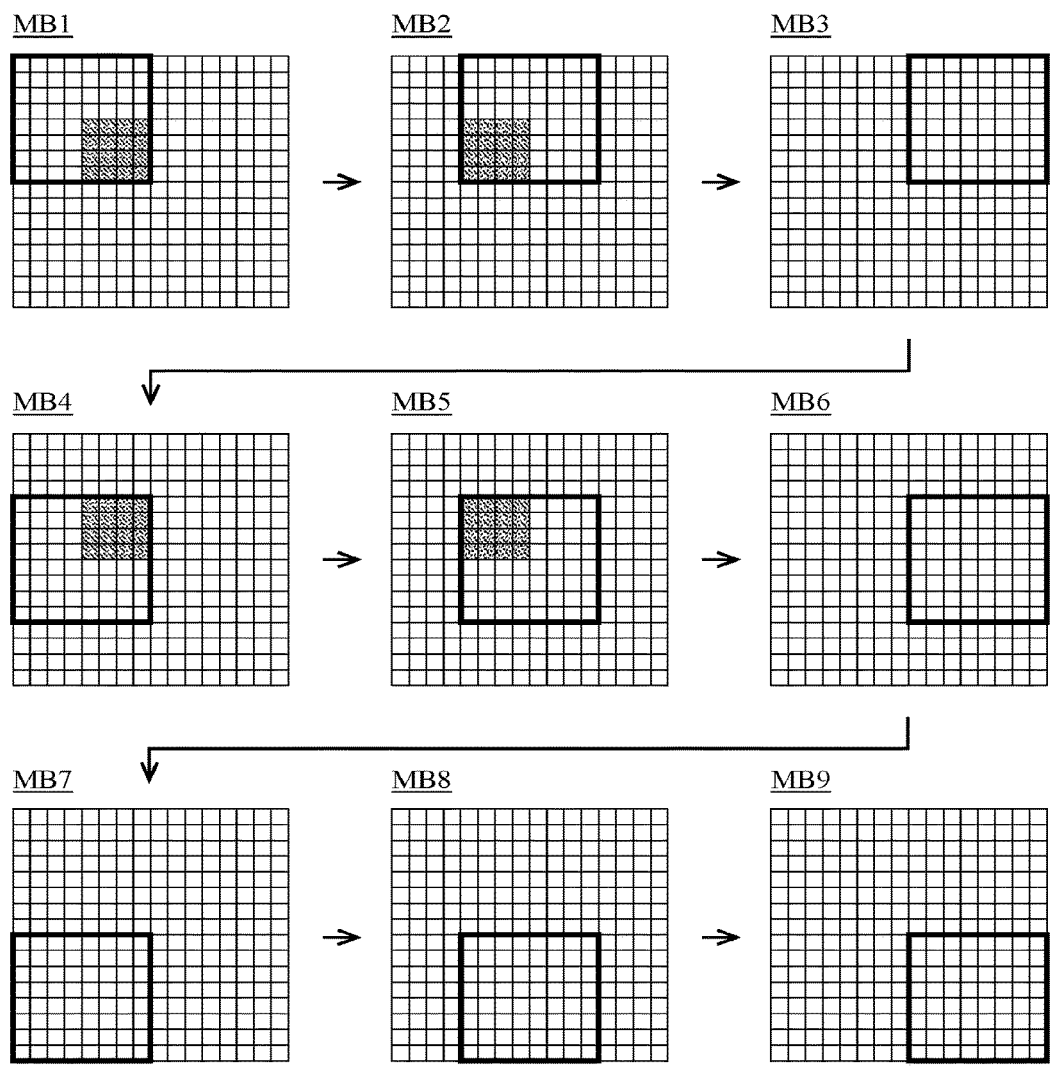
FIG. 9 is a diagram illustrating overlapping.

FIG. 9 is a diagram illustrating overlapping. FIG. 9 illustrates the input image having 16 rows×16 columns to facilitate the description. Firstly a macroblock MB1 is extracted, starting from the top-left corner, as oriented in the figure, of the input image. Then a macroblock MB2 is extracted, from the position shifted row-wise by four pixels from the macroblock MB1. Then a macroblock MB3 is extracted from the position shifted row-wise by four pixels from the macroblock MB2. Then a macroblock MB4 is extracted from the position shifted column-wise by four pixels from the macroblock MB1. From then on, macroblocks MB5 to MB9 are similarly extracted in sequence. Thus the transform circuit 11, the quantization circuit 12, the correction circuit 13, the inverse quantization circuit 14, and the inverse transform circuit 15 sequentially process partially-overlapping multiple macroblocks MB1 to MB9 extracted from the input image.

For a portion of the output image where multiple macroblocks overlap each other, an optimal value (in this example, an average) obtained from the overlapping multiple macroblocks is output as image data of this portion. For example, four macroblocks MB1, MB2, MB4, and MB5 overlap each other in the portion having 4 rows×4 columns of the image colored gray in FIG. 9, and thus image data D6 is obtained for each of these four macroblocks. Thus the image data D6 of this portion of these four macroblocks are added together, and the value obtained by the addition is divided by four, which is the number of macroblocks overlapping each other, so that an average of the image data D6 of the multiple macroblocks overlapping each other is calculated. Then the average is output from the image processor 1 as the image data D6 of this portion of the image.

As a first modification of overlapping, the above optimal value may be, instead of the above average, an output value (image data D6) of a macroblock having the smallest noise value NOISE(MB) among multiple macroblocks overlapping each other.

As a second modification of overlapping, for a portion of the image where multiple macroblocks overlap each other, an output value of this portion of the image obtained in processing a current macroblock may be used for an input value of this portion of the image for processing a subsequent macroblock. For example, regarding the portion having 4 rows×4 columns of the image colored gray in FIG. 9, an output value (image data D6) obtained in processing the macroblock MB1 is used for an input value (image data D1) for processing the macroblock MB2, an output value obtained in processing the macroblock MB2 is used for an input value for processing the macroblock MB4, and an output value obtained in processing the macroblock MB4 is used for an input value for processing the macroblock MB5. In this method, denoising of the same portion of the image is performed practically multiple times in sequentially processing multiple macroblocks, achieving a shorter processing time, in comparison with denoising by obtaining an average of multiple output values.

<Calculation of ACT(MB)>

The arithmetic circuit 20 calculates an average AVE_BLK of weighted means in a macroblock given by Equation 4. Then the arithmetic circuit 20 calculates a sum of absolute difference between the weighted mean GAUS (i, j) of each pixel and the average AVE_BLK in the macroblock given by Equation 5. Then the arithmetic circuit 20 calculates an average of the sum of absolute difference in the macroblock given by Equation 6, which serves as the per-macroblock activity evaluation value ACT(MB).

Equation 4

$$\text{AVE\_BLK} = \left(\sum_{j=0}^{7}\sum_{i=0}^{7} GAUS(i, j)\right) // 64 \quad (4)$$

Equation 5

$$\text{vari\_8} \times 8blk = \sum_{j=0}^{7}\sum_{i=0}^{7} |GAUS(i, j) - \text{AVE\_BLK}| \quad (5)$$

Equation 6

$$ACT(MB) = \text{vari\_8} \times 8blk // 64 \quad (6)$$

<First Setting of QP(MB)>

Figure 10A:
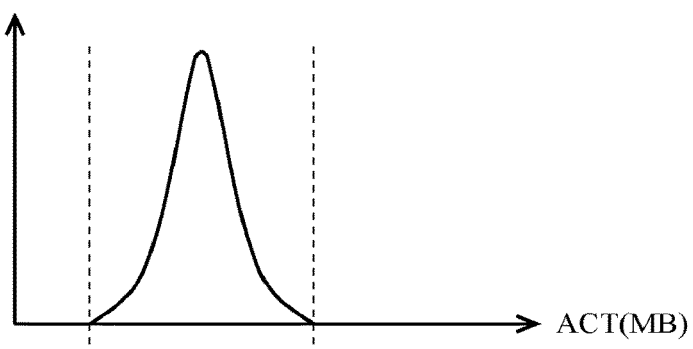
FIGS. 10A to 10C are diagrams for illustrating first setting of the quantization value.
Figure 10B:
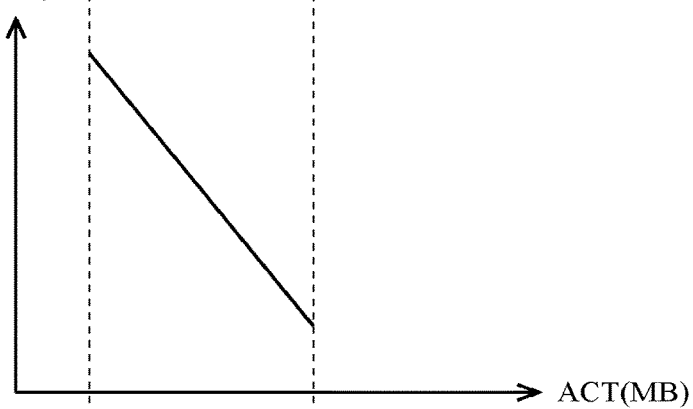
Figure 10C:
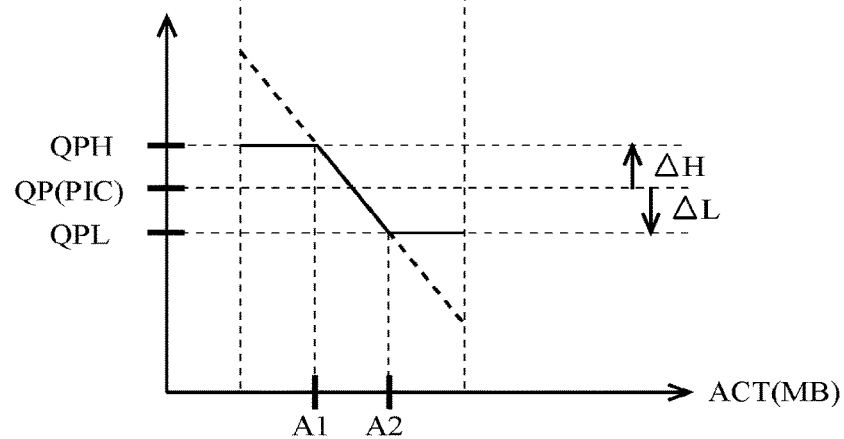

FIGS. 10A to 10C are diagrams for illustrating first setting of the quantization value QP(MB) by the setting circuit 22. The setting circuit 22 sets the quantization value QP(MB) on the basis of the quantization value QP(PIC) and the activity evaluation value ACT(MB). The setting circuit 22 holds a look-up table containing an optimal quantization value QP(MB) for each activity evaluation value ACT(MB). As illustrated in FIGS. 10A and 10B, the setting circuit 22 normalizes the look-up table in a distribution range of the activity evaluation value ACT(MB), in the histogram of the activity evaluation value ACT(MB) and the number of macroblocks. As illustrated in FIG. 10B, according to the look-up table, the quantization value QP(MB) decreases with increase in the activity evaluation value ACT(MB). As illustrated in FIG. 10C, the setting circuit 22 sets an upper-limit quantization value QPH to a value larger than the quantization value QP(PIC) by ΔH and a lower-limit quantization value QPL to a value smaller than the quantization value QP(PIC) by ΔL. Then the setting circuit 22 sets the quantization value QP(MB) of a macroblock whose quantization value QP(MB) in FIG. 10B exceeds the upper-limit quantization value QPH, which is a macroblock having a small activity evaluation value ACT(MB) (smaller than value A1), to the upper-limit quantization value QPH. The quantization value QP(MB) of a macroblock whose quantization value QP(MB) in FIG. 10B is smaller than or equal to the upper-limit quantization value QPH and larger than or equal to the lower-limit quantization value QPL, which is a macroblock having a medium activity evaluation value ACT(MB) (larger than or equal to value A1 and smaller than or equal to value A2), is set to the quantization value QP(MB) in FIG. 10B without change. The quantization value QP(MB) of a macroblock whose quantization value QP(MB) in FIG. 10B is smaller than the lower-limit quantization value QPL, which is a macroblock having a large activity evaluation value ACT(MB) (larger than value A2), is set to the lower-limit quantization value QPL.

<Second Setting of QP(MB)>

Figure 11:
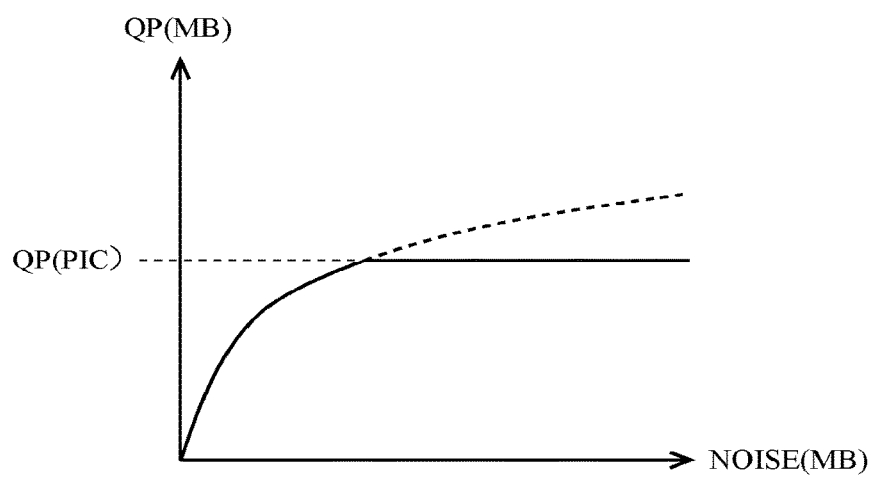
FIG. 11 is a diagram for illustrating second setting of the quantization value.

FIG. 11 is a diagram for illustrating second setting of the quantization value QP(MB) by the setting circuit 22. The setting circuit 22 sets the quantization value QP(MB) on the basis of the quantization value QP(PIC) and the noise value NOISE(MB). The setting circuit 22 calculates the quantization value QP(MB) given by Equation 7 on the basis of the noise value NOISE(MB). As illustrated in FIG. 11, the setting circuit 22 increases the quantization value QP(MB) with increase in the noise value NOISE(MB).

Equation 7

$$QP(MB) = gain * (6 * \log 2(NOISE(MB))) + \text{offset} \quad (7)$$

The setting circuit 22 uses the quantization value QP(PIC) for the upper limit of the quantization value QP(MB), so that if the quantization value QP(MB) given by Equation 7 exceeds the quantization value QP(PIC), the quantization value QP(MB) is set to the quantization value QP(PIC).

Figure 12:
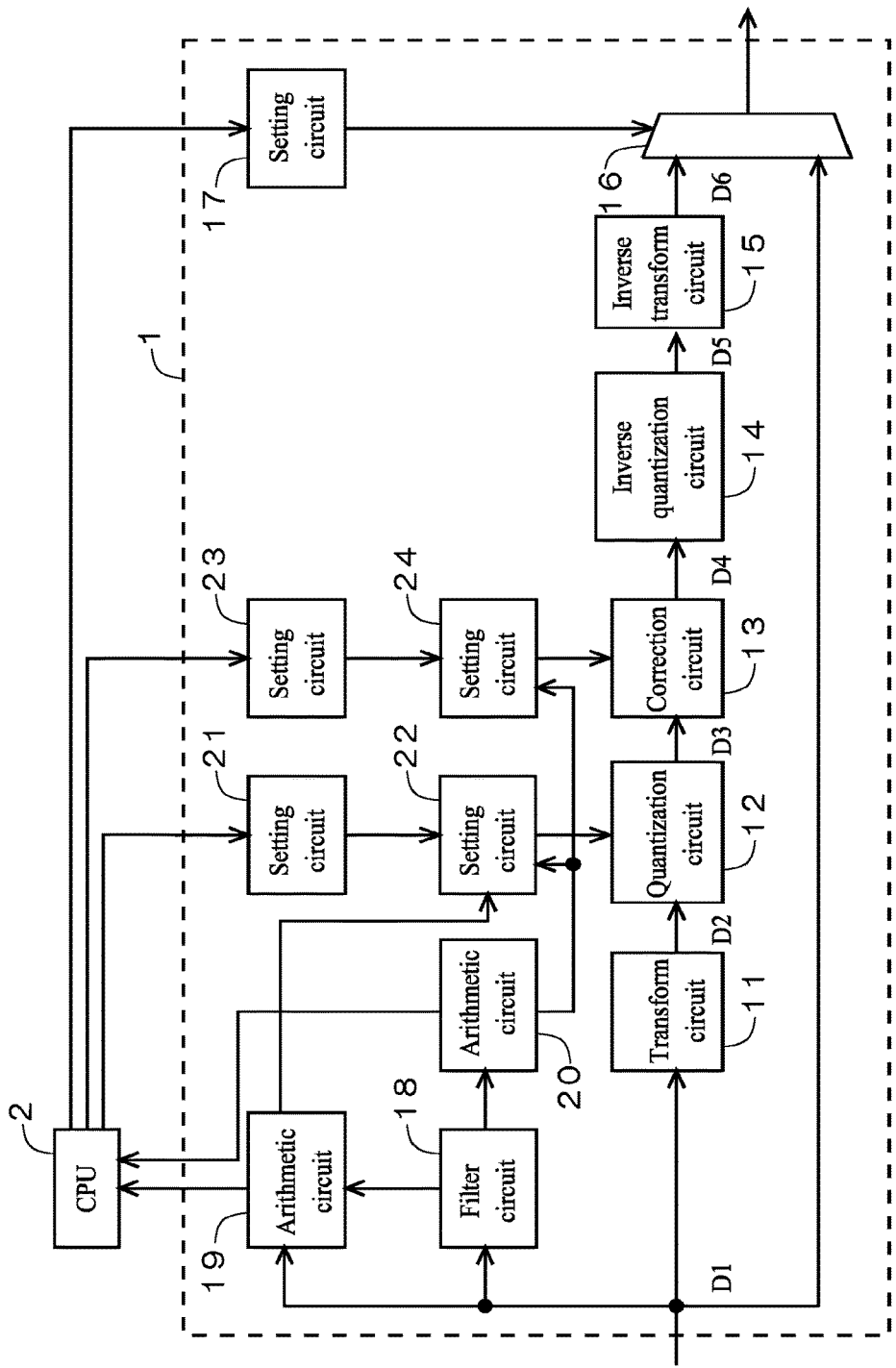
FIG. 12 is a diagram illustrating a configuration of the image processor to realize the second setting of the quantization value.

FIG. 12 is a diagram illustrating a configuration of the image processor 1 to realize the second setting of the quantization value QP(MB). The noise value NOISE(MB) is input from the arithmetic circuit 19 to the setting circuit 22.

The quantization value QP(PIC) can be calculated by replacing the noise value NOISE(MB) in Equation 7 by noise value NOISE(PIC). Thus the setting circuit 21 may set the quantization value QP(PIC) using an operation in accordance with Equation 7, instead of the look-up table illustrated in FIG. 3.

<Setting of SM(MB)>

FIGS. 13 to 15 are diagrams for illustrating setting of the scaling matrix SM(MB) by the setting circuit 24. The setting circuit 24 sets the scaling matrix SM(MB) on the basis of the scaling matrix SM(PIC) and the activity evaluation value ACT(MB).

Referring to FIG. 13, the setting circuit 24 performs masking on the scaling matrix SM(PIC) with a low-level mask ML for a macroblock having a small activity evaluation value ACT(MB) (smaller than value A1). The mask ML has a mask value for passing through a low-frequency component with a multiplier "1" and cutting off middle- and high-frequency components with a multiplier being substantially zero. Thus the correction value of the scaling matrix SM(MB) for low-frequency components is set to that of the scaling matrix SM(PIC) and the correction value of the scaling matrix SM(MB) for middle- and high-frequency components is set to substantially zero.

Referring to FIG. 14, the setting circuit 24 performs masking on the scaling matrix SM(PIC) with a middle-level mask MM for a macroblock having a medium activity evaluation value ACT(MB) (larger than or equal to value A1 and smaller than or equal to value A2). The mask MM has a masking value for passing through low- and middle-frequency components with a multiplier "1" and cutting off a high-frequency component with a multiplier being substantially zero. Thus the correction value of the scaling matrix SM(MB) for low- and middle-frequency components is set to that of the scaling matrix SM(PIC) and the correction value of the scaling matrix SM(MB) for a high-frequency component is set to substantially zero.

Referring to FIG. 15, the setting circuit 24 performs masking on the scaling matrix SM(PIC) with a high-level mask MH for a macroblock having a large activity evaluation value ACT(MB) (larger than value A2). The mask MH has a mask value for passing through low-, middle-, and high-frequency components with a multiplier "1". Thus the correction value of the scaling matrix SM(MB) for all low-, middle-, and high-frequency components is set to that of the scaling matrix SM(PIC).

Masking of three scales with three masks ML, MM, and MH is described above as an example, while masking of four or more scales (for example, eight scales) may be possible by preparing four or more masks depending on a variable such as the activity evaluation value ACT(MB). Furthermore, the multiplier of each of the masks ML, MM, and MH illustrated in FIGS. 13 to 15 is only a non-limiting example. The multiplier of each of the masks ML, MM, and MH can be set to an arbitrary value depending on, for example, an amount of noise.

<Determination Whether Denoising is to be Performed>

The arithmetic circuit 19 calculates an average of the noise values NOISE(MB) of all macroblocks in the input image which serves as the noise value NOISE(PIC), and inputs the noise value NOISE(PIC) to the CPU 2. The arithmetic circuit 20 also calculates an average of the activity evaluation values ACT(MB) of all macroblocks in the input image which serves as the activity evaluation value ACT(PIC), and inputs the activity evaluation value ACT(PIC) to the CPU 2.

The CPU 2 determines whether denoising is to be performed for each input image, on the basis of the noise value NOISE(PIC) of the whole input image and the activity evaluation value ACT(PIC) of the whole input image.

The CPU 2 divides the noise value NOISE(PIC) by the activity evaluation value ACT(PIC) (NOISE(PIC)/ACT(PIC)) to calculate a noise strength. Then if the noise strength is lower than a predetermined threshold (for example, "1"), denoising is determined to be unnecessary, while if the noise strength is higher than or equal to the threshold, denoising is determined to be necessary. Thus controlling ON/OFF of denoising in a unit of a picture achieves reduction in power consumption.

If delay time in processing is not a problem, for example, when the input image is a still picture, the CPU 2 can calculate the noise value NOISE(PIC) and the activity evaluation value ACT(PIC) of the input image itself, and on the basis of them, determine whether denoising is to be performed.

In contrast, if delay time in processing is a problem, for example, when the input image is a moving picture, the CPU 2 can determine whether denoising is to be performed on a current input image, on the basis of the noise value NOISE(PIC) and the activity evaluation value ACT(PIC) of an immediately preceding input image (i.e., image of one frame before).

<First Modification>

In the above embodiment, the quantization value is set on the basis of both the quantization value QP(PIC) and the quantization value QP(MB), and the correction value is set on the basis of both the scaling matrix SM(PIC) and the scaling matrix SM(MB), but the quantization value may be set on the basis of the quantization value QP(PIC) only, and the correction value may be set on the basis of the scaling matrix SM(PIC) only.

Figure 16:
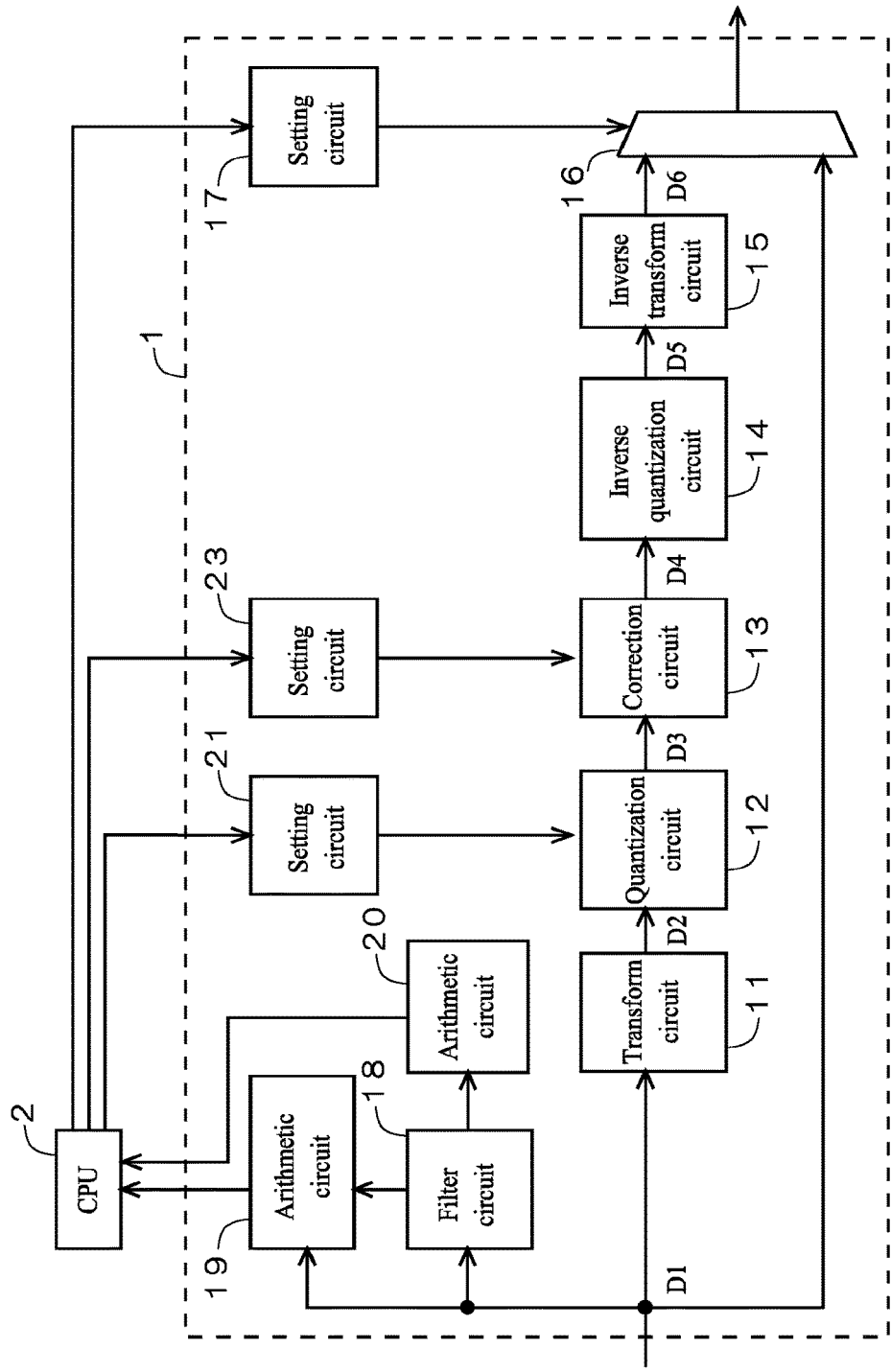
FIG. 16 is a diagram illustrating a configuration of the image processor according to a first modification.

FIG. 16 is a diagram illustrating a configuration of the image processor 1 according to the present modification. The setting circuits 22 and 24 are omitted from the configuration illustrated in FIG. 1.

Figure 17:
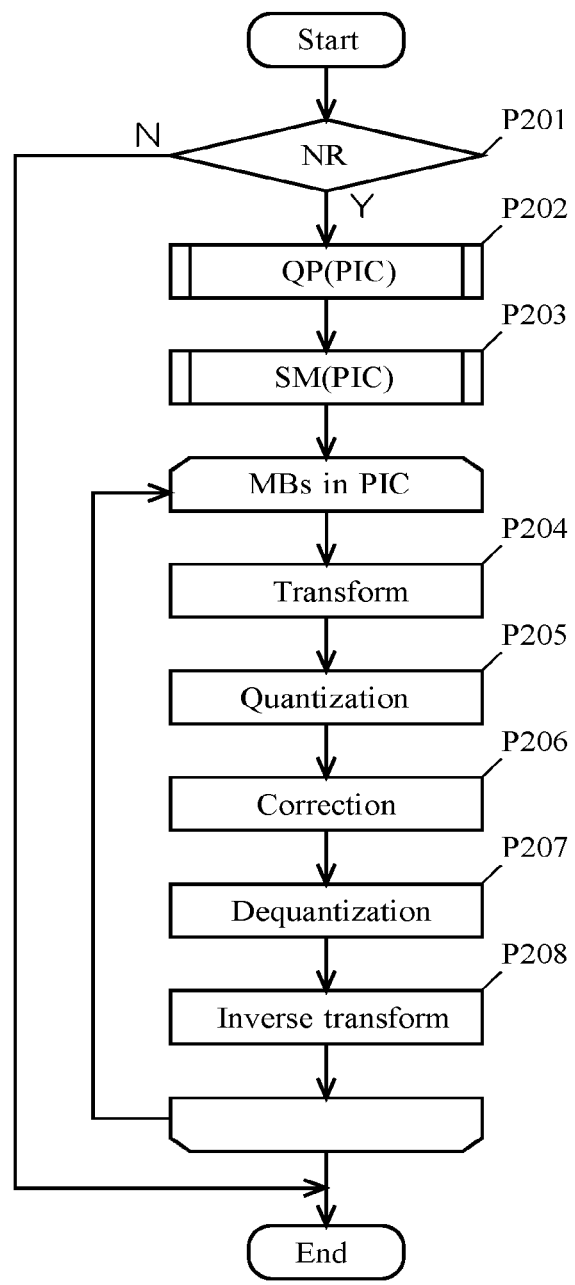
FIG. 17 is a flow chart illustrating the sequence of denoising by the image processor according to the first modification.

FIG. 17 is a flow chart illustrating the sequence of denoising by the image processor 1 according to the present modification. Firstly in Step P201, the setting circuit 17 sets the selector 16, in accordance with determination by the CPU 2 as to whether denoising is to be performed. If denoising is unnecessary, processing ends.

If denoising is necessary, in Step P202, the setting circuit 21 sets the quantization value QP(PIC).

In Step P203, the setting circuit 23 sets the scaling matrix SM(PIC).

In Steps P204 to P208, per-macroblock denoising is repeated for all macroblocks in the input image.

In Step P204, the transform circuit 11 transforms the image data D1 into the image data D2.

In Step P205, the quantization circuit 12 performs quantization using the quantization value QP(PIC) on the image data D2 to generate the image data D3.

In Step P206, the correction circuit 13 performs correction using the scaling matrix SM(PIC) on the image data D3 to generate the image data D4.

In Step P207, the inverse quantization circuit 14 performs inverse quantization on the image data D4 to generate the image data D5.

In Step P208, the inverse transform circuit 15 transforms the image data D5 into the image data D6 by inverse DCT transform. Processing ends with completion of per-macroblock denoising for all macroblocks in the input image.

<Second Modification>

In the above embodiment, the quantization value is set on the basis of both the quantization value QP(PIC) and the quantization value QP(MB), and the correction value is set on the basis of both the scaling matrix SM(PIC) and the scaling matrix SM(MB), but the quantization value may be set on the basis of the quantization value QP(MB) only, and the correction value may be set on the basis of the scaling matrix SM(MB) only.

Figure 18:
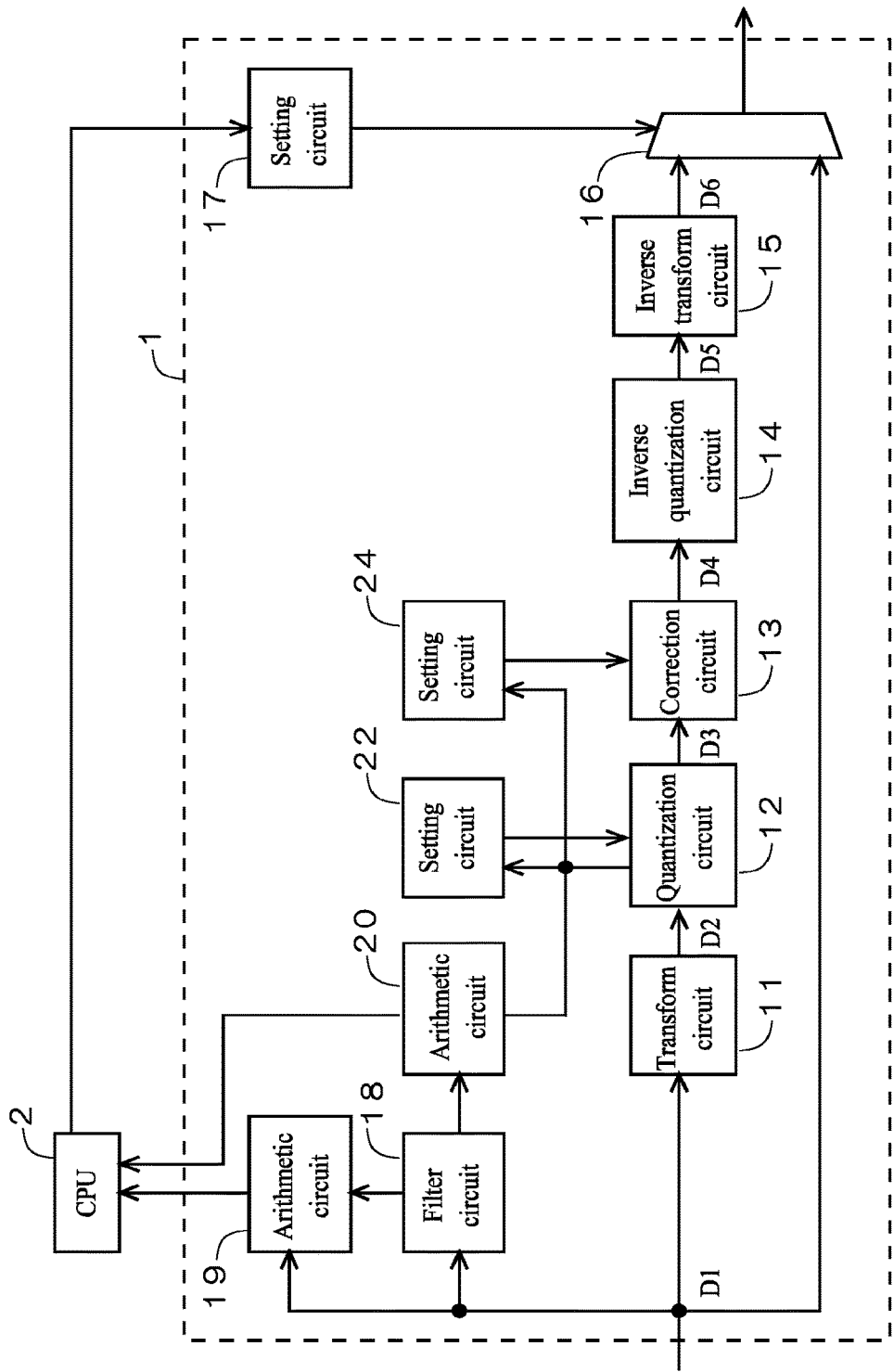
FIG. 18 is a diagram illustrating a configuration of the image processor according to a second modification.

FIG. 18 is a diagram illustrating a configuration of the image processor 1 according to the present modification. The setting circuits 21 and 23 are omitted from the configuration illustrated in FIG. 1.

Figure 19:
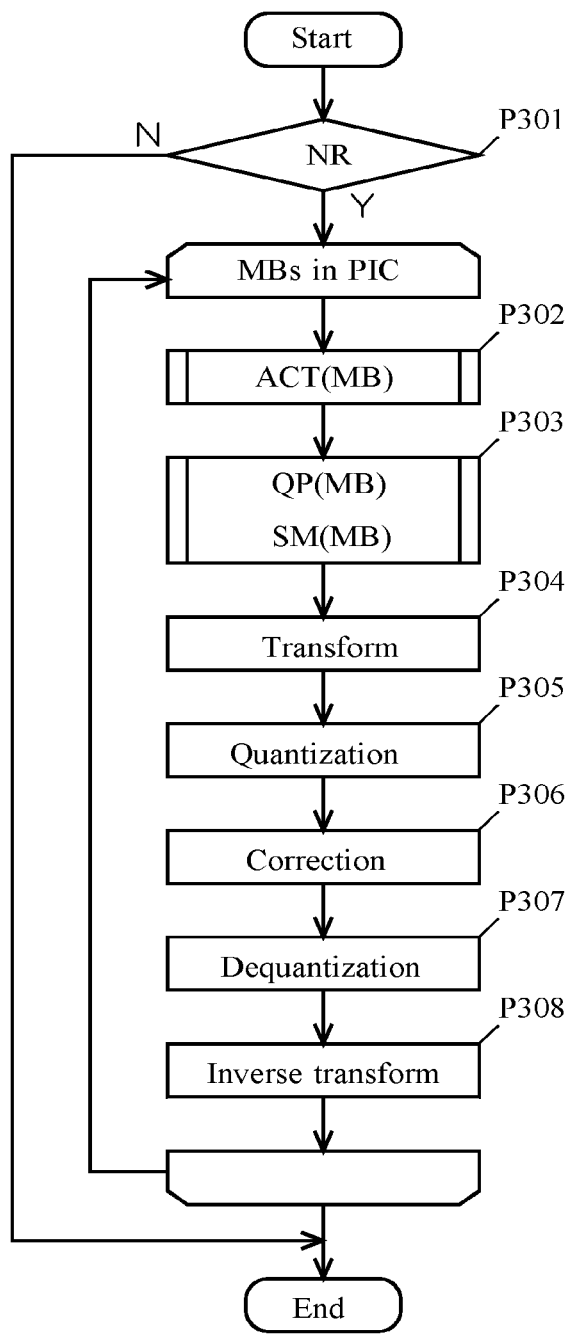
FIG. 19 is a flow chart illustrating the sequence of denoising by the image processor according to the second modification.

FIG. 19 is a flow chart illustrating the sequence of denoising by the image processor 1 according to the present modification. Firstly in Step P301, the setting circuit 17 sets the selector 16, in accordance with determination by the CPU 2 as to whether denoising is to be performed. If denoising is unnecessary, processing ends.

In Steps P302 to P308, per-macroblock denoising is repeated for all macroblocks in the input image.

In Step P302, the arithmetic circuit 20 calculates the activity evaluation value ACT(MB).

In Step P303, the setting circuit 22 sets the quantization value QP(MB). The setting circuit 24 also sets the scaling matrix SM(MB). In the present modification, the setting circuit 24 uses the low-level mask ML (FIG. 13) as the scaling matrix SM(MB) for a macroblock having a small activity evaluation value ACT(MB)(smaller than value A1). For a macroblock having a medium activity evaluation value ACT(MB) (larger than or equal to value A1 and smaller than or equal to value A2), the setting circuit 24 uses the middle-level mask MM (FIG. 14) as the scaling matrix SM(MB). For a macroblock having a large activity evaluation value ACT(MB) (larger than value A2), the setting circuit 24 uses the high-level mask MH (FIG. 15) as the scaling matrix SM (MB).

In Step P304, the transform circuit 11 transforms the image data D1 into the image data D2.

In Step P305, the quantization circuit 12 performs quantization using the quantization value QP(MB) on the image data D2 to generate the image data D3.

In Step P306, the correction circuit 13 performs correction on the scaling matrix SM(MB) on the image data D3 to generate the image data D4.

In Step P307, the inverse quantization circuit 14 performs inverse quantization on the image data D4 to generate the image data D5.

In Step P308, the inverse transform circuit 15 transforms the image data D5 into the image data D6 by inverse DCT transform. Processing ends with completion of per-macroblock denoising for all macroblocks in the input image.

<Third Modification>

In the above embodiment, the denoising is individually performed on each color component of the input image, but integrated denoising on all (or part of multiple) color components may be performed.

The arithmetic circuit 19 averages the noise values NOISE(PIC) of each color component to calculate an average noise value NOISE(PIC) of all color components. The arithmetic circuit 20 averages the activity evaluation values ACT(PIC) of each color component to calculate an average activity evaluation value ACT(PIC) of all color components.

The arithmetic circuit 19 averages the noise values NOISE(MB) of each color component to calculate an average noise value NOISE(MB) of all color components. The arithmetic circuit 20 averages the activity evaluation values ACT(MB) of each color component to calculate an average activity evaluation value ACT(MB) of all color components.

These average noise values NOISE(PIC) and NOISE(MB) and average activity evaluation values ACT(PIC) and ACT(MB) are used to set common quantization values QP(PIC) and QP(MB) and common scaling matrices SM(PIC) and SM(MB) common to all color components to perform integrated denoising.

Thus integrated denoising performed on all (or part of multiple) color component achieves improved accuracy of noise detection. Furthermore, since variation in denoising effect among color components is eliminated or reduced, image quality is improved.

On the other hand, individual denoising for each color component of the input image as in the above embodiment achieves optimal denoising effect for each color component. If the amount of noise significantly differs among color components, such as when the amount of noise of only some of color components is outstanding, the method according to above embodiment is effective.

<Fourth Modification>

In the above embodiment, the image processor 1 is configured as hardware such as a dedicated LSI. Instead of this configuration, a function similar to that of the image processor 1 can be realized by software processing by the CPU 2 that reads and executes a program stored in a recording medium such as a ROM.

<Recapitulation>

In the image processor 1 according to the above embodiment and first modification, the setting circuit 21 (first quantization value setting circuit) sets quantization value QP(PIC) (first quantization value) per input image on the basis of the noise value NOISE(PIC) of the whole input image, and the quantization circuit 12 performs quantization on the image data D2 (second image data) to generate the image data D3 (third image data). Quantization using the quantization value QP(PIC) based on the noise value NOISE (PIC) of the whole input image realizes appropriate denoising depending on a noise level of the whole input image. In consequence, high denoising effect is realized while image degradation is avoided. In comparison with applying a spatial filter multiple times in an effort to improve denoising effect, processing time is reduced, and with no need for a temporal memory for storing intermediate values, circuit size is also reduced.

In the image processor 1 according to the above embodiment and first modification, the setting circuit 23 (first correction value setting circuit) sets the scaling matrix SM(PIC) (first correction value) per input image on the basis of the image data D2 of the whole input image, and the correction circuit 13 performs correction per frequency component on the image data D3 to generate the image data D4 (fourth image data). Correction on a per frequency component basis using the scaling matrix SM(PIC) based on the image data D2 of the whole input image realizes appropriate denoising depending on a noise level per frequency component.

In the image processor 1 according to the above embodiment, the arithmetic circuit 19 (first arithmetic circuit) calculates a sum of absolute difference between a pixel value of each pixel and a smoothing value (weighted mean in the above example) of each pixel, and calculates an average of the sum of absolute difference in a macroblock to obtain a per-macroblock noise value NOISE(MB). Thus the arithmetic circuit 19 appropriately obtains the noise value NOISE (MB) on a per macroblock basis.

In the image processor 1 according to the above embodiment, the setting circuit 21 increases the quantization value QP(PIC) with increase in a noise value. When the noise value NOISE(PIC) of the whole input image is large, a large quantization value QP(PIC) achieves high denoising effect by quantization. When the noise value NOISE(PIC) of the whole input image is small, a small quantization value QP(PIC) avoids image degradation due to quantization.

In the image processor 1 according to the above embodiment, the setting circuit 22 (second quantization value setting circuit) sets the per-macroblock quantization value QP(MB) (second quantization value) for quantization, on the basis of the quantization value QP(PIC) and the per-macroblock activity evaluation value ACT(MB). The per-macroblock quantization value QP(MB) based on the quantization value QP(PIC) based on the noise value NOISE (PIC) of the whole input image and the per-macroblock activity evaluation value ACT(MB) realizes appropriate denoising on a per macroblock basis depending on the noise level of the whole input image and the attribute of a macroblock. In consequence, since decrease in resolution is effectively avoided, the image quality is improved as a whole.

In the image processor 1 according to the above embodiment, the arithmetic circuit 20 (second arithmetic circuit) calculates a sum of absolute difference between a smoothing value of each pixel and an average smoothing value in a macroblock, and calculates an average of the sum of absolute difference in the macroblock to obtain the per-macroblock activity evaluation value ACT(MB). Thus the arithmetic circuit 20 appropriately obtains the activity evaluation value ACT(MB) on a per macroblock basis.

In the image processor 1 according to the above embodiment, the setting circuit 22 sets the quantization value QP(MB) of a macroblock having a small activity evaluation value ACT(MB) to a quantization value larger than the quantization value QP(PIC). In a flat portion having a small activity evaluation value ACT(MB) where noise is noticeable, a large quantization value QP(MB) achieves high denoising effect by quantization. The setting circuit 22 sets the quantization value QP(MB) of a macroblock having a large activity evaluation value ACT(MB) to a quantization value smaller than the quantization value QP(PIC). In an edge or texture portion having a large activity evaluation value ACT(MB), a small quantization value QP(MB) prevents the edge or texture portion from blurring due to quantization, and thus improves image quality. The setting circuit 22 sets the quantization value QP(MB) of a macroblock having a medium activity evaluation value ACT(MB) to a value similar to the quantization value QP(PIC). In an image portion other than flat, edge, and texture portions, a medium quantization value QP(MB) avoids excessive or insufficient denoising effect on the image portion.

In the image processor 1 according to the above embodiment, the setting circuit 22 sets a per-macroblock quantization value QP(MB) for quantization, on the basis of the quantization value QP(PIC) and the per-macroblock noise value NOISE(MB). The per-macroblock quantization value QP(MB) based on the quantization value QP(PIC) based on the noise value NOISE(PIC) of the whole input image and the per-macroblock noise value NOISE(MB) realizes appropriate denoising on a per macroblock basis depending on the noise level of the whole input image and the noise level per macroblock. In consequence, since decrease in resolution is effectively avoided, the image quality is improved as a whole.

In the image processor 1 according to the above embodiment, the setting circuit 22 increases the quantization value QP(MB) with increase in the noise value NOISE(MB) with the quantization value QP(PIC) being an upper limit. For a macroblock having a large noise value NOISE(MB), a large quantization value QP(MB) achieves high denoising effect by quantization. For a macroblock having a small noise value NOISE(MB), a small quantization value QP(MB) avoids image degradation due to quantization. Providing the upper limit at the quantization value QP(PIC) restricts the difference between the maximum and the minimum quantization value to a certain range, eliminating or reducing "floppiness", and thus the image quality is improved as a whole.

In the image processor 1 according to the above embodiment, the setting circuit 23 sets the first correction value to the transform value for transforming each frequency component value in the input image so that a ratio among frequency component values in the input image equals to that in the ideal image including no noise. Such first correction value realizes correction to bring the output image close to the ideal image, and thus improves image quality.

In the image processor 1 according to the above embodiment, the setting circuit 24 (second correction value setting circuit) sets the per-macroblock scaling matrix SM(MB) (second correction value) for correction, on the basis of the first correction value and the per-macroblock activity evaluation value ACT(MB). The per-macroblock second correction value based on the first correction value based on the image data D2 of the whole input image and the per-macroblock activity evaluation value ACT(MB) realizes appropriate correction on a per macroblock basis depending on the frequency component value of the whole input image and the attribute of a macroblock. In consequence, denoising effect per macroblock is improved and thus the image quality is improved as a whole.

In the image processor 1 according to the above embodiment, the setting circuit 24 holds multiple types of masks depending on the activity evaluation value ACT(MB), the masks containing arbitrary multipliers by frequency components, and performs masking on the first correction value using one of the masks corresponding to the activity evaluation value ACT(MB) calculated by the arithmetic circuit 20 to set the second correction value. In consequence, the second correction value depending on the per-macroblock activity evaluation value ACT(MB) is obtained simply and appropriately from the first correction value.

In the image processor 1 according to the above embodiment, the setting circuit 24 sets the second correction value for a macroblock having a small activity evaluation value ACT(MB) to the first correction value for a low-frequency component, while setting the second correction value to substantially zero for middle- and high-frequency components. In a flat portion having a small activity evaluation value ACT(MB) where noise is noticeable, masking to cut off middle- and high-frequency components achieves high denoising effect by correction. The setting circuit 24 sets the second correction value for a macroblock having a large activity evaluation value ACT(MB) to the first correction value for low-, middle-, and high-frequency components. In an edge or texture portion having a large activity evaluation value ACT(MB), masking not to cut off any frequency component realizes correction to sharpen the edge or texture portion, and thus improves image quality. The setting circuit 24 sets the second correction value for a macroblock having a medium activity evaluation value ACT(MB) to the first correction value for low- and middle-frequency components while setting the second correction value to substantially zero for a high-frequency component. In an image portion other than flat, edge, and texture portions, masking to cut off only a high-frequency component achieves moderate denoising effect by correction.

In the image processor 1 according to the above embodiment, the CPU 2 (determination circuit) determines whether denoising is to be performed on the basis of the noise value NOISE(PIC) of the whole input image and the activity evaluation value ACT(PIC) of the whole input image. Thus since denoising is performed on an input image that truly requires denoising while denoising on an input image that requires no denoising is avoided, power consumption is reduced.

In the image processor 1 according to the above embodiment, the CPU 2 divides the noise value NOISE(PIC) of the whole input image by the activity evaluation value ACT(PIC) of the whole input image to calculate a noise strength. Then if the noise strength is lower than a predetermined threshold, denoising is determined to be unnecessary, while if the noise strength is higher than or equal to the threshold, denoising is determined to be necessary. Such determination by the CPU 2 achieves highly accurate identification of an input image that truly requires denoising.

In the image processor 1 according to the above embodiment, the transform circuit 11, the quantization circuit 12, and the correction circuit 13 sequentially process partially-overlapping multiple macroblocks extracted from the input image. Partially overlapping macroblocks one another eliminates or reduces block noise. For a portion of the output image where multiple macroblocks overlap each other, an optimal value (average, in the above example) obtained from the overlapping macroblocks is output as image data of this portion of the image. Output of optimal value obtained from multiple macroblocks for overlapping portion realizes high denoising effect while avoiding image degradation.

In the image processor 1 according to the above embodiment and second modification, the setting circuit 22 (quantization value setting circuit) sets the per-macroblock quantization value QP(MB) for quantization, on the basis of the per-macroblock activity evaluation value ACT(MB). The per-macroblock quantization value QP(MB) based on the per-macroblock activity evaluation value ACT(MB) realizes appropriate denoising on a per macroblock basis depending on the attribute of a macroblock. In consequence, since decrease in resolution is effectively avoided, the image quality is improved as a whole. In comparison with applying a spatial filter multiple times in an effort to improve denoising effect, processing time is reduced, and with no need for a temporal memory for storing intermediate values, circuit size is also reduced.

In the image processor 1 according to the above embodiment and second modification, the setting circuit 24 (correction value setting circuit) sets the per-macroblock scaling matrix SM(MB) (correction value) for correction, on the basis of the per-macroblock activity evaluation value ACT (MB). The per-macroblock correction value based on the per-macroblock activity evaluation value ACT(MB) realizes appropriate correction on a per macroblock basis depending on the attribute of a macroblock. In consequence, denoising effect per block is improved and thus the image quality is improved as a whole.

In the image processor 1 according to the above embodiment, the arithmetic circuit 20 calculates a sum of absolute difference between a smoothing value (weighted mean in the above example) of each pixel and an average smoothing value in a macroblock, and calculates an average of the sum of absolute difference in the macroblock to obtain a per-macroblock activity evaluation value ACT(MB). Thus the arithmetic circuit 20 appropriately obtains the activity evaluation value ACT(MB) on a per macroblock basis.

In the image processor 1 according to the above embodiment, the setting circuit 22 sets the quantization value QP(MB) of a macroblock having a small activity evaluation value ACT(MB) to a large value. In a flat portion having a small activity evaluation value ACT(MB) where noise is noticeable, a large quantization value QP(MB) achieves high denoising effect by quantization. The setting circuit 22 sets the quantization value QP(MB) of a macroblock having a large activity evaluation value ACT(MB) to a small value. In an edge or texture portion having a large activity evaluation value ACT(MB) a small quantization value QP(MB) prevents the edge or texture portion from blurring due to quantization, and thus improves image quality. The setting circuit 22 sets the quantization value QP(MB) of a macroblock having a medium activity evaluation value ACT(MB) to a medium value. In an image portion other than flat, edge, and texture portions, a medium quantization value QP(MB) avoids excessive or insufficient denoising effect on the image portion.

In the image processor 1 according to the above embodiment, the setting circuit 22 sets the per-macroblock quantization value QP(MB) for quantization, on the basis of the per-macroblock noise value NOISE(MB). The per-macroblock quantization value QP(MB) based on the per-macroblock noise value NOISE(MB) realizes appropriate denoising on a per macroblock basis depending on the noise level per macroblock. In consequence, since decrease in resolution is effectively avoided, the image quality is improved as a whole. In comparison with applying a spatial filter multiple times in an effort to improve denoising effect, processing time is reduced, and with no need for a temporal memory for storing intermediate values, circuit size is also reduced.

In the image processor 1 according to the above embodiment, the setting circuit 24 sets the per-macroblock correction value for correction, on the basis of the per-macroblock activity evaluation value ACT(MB). The per-macroblock correction value based on the per-macroblock activity evaluation value ACT(MB) realizes appropriate correction on a per macroblock basis depending on the attribute of a macroblock. In consequence, denoising effect per macroblock is improved and thus the image quality is improved as a whole.

In the image processor 1 according to the above embodiment, the setting circuit 22 increases the quantization value QP(MB) with increase in a noise value. For a macroblock having a large noise value, a large quantization value QP(MB) achieves high denoising effect by quantization. For a macroblock having a small noise value, a small quantization value QP(MB) avoids image degradation due to quantization.

In the image processor 1 according to the above embodiment, the setting circuit 24 holds multiple types of masks depending on the activity evaluation value ACT(MB), the masks containing arbitrary multipliers by frequency components, and sets the correction value to the multiplier for one of the masks corresponding to the activity evaluation value ACT(MB) calculated by the arithmetic circuit 20. In consequence, the correction value depending on the per-macroblock activity evaluation value ACT(MB) is obtained simply and appropriately.

In the image processor 1 according to the above embodiment, the setting circuit 24 sets the correction value for a macroblock having a small activity evaluation value ACT (MB) to one time for a low-frequency component, while setting the correction value to substantially zero time for middle- and high-frequency components. In a flat portion having a small activity evaluation value ACT(MB) where noise is noticeable, masking to cut off middle- and high-frequency components achieves high denoising effect by correction. The setting circuit 24 sets the correction value for a macroblock having a large activity evaluation value ACT (MB) to one time for low-, middle-, and high-frequency components. In an edge or texture portion having a large activity evaluation value ACT(MB), masking not to cut off any frequency component realizes correction to sharpen the edge or texture portions, and thus improves image quality. The setting circuit 24 set the correction value for a macroblock having a medium activity evaluation value ACT(MB) to one time for low- and middle-frequency components, while setting the correction value to substantially zero time for high-frequency components. In an image portion other than flat, edge, and texture portions, masking to cut off only a high-frequency component achieves moderate denoising effect by correction.

In the image processor 1 according to the above embodiment, the setting circuit 23 (first correction value setting circuit) sets the scaling matrix SM(PIC) (first correction value) per input image on the basis of the image data D2 (second image data) of the whole input image, and the correction circuit 13 performs correction per frequency component on the image data D3 (third image data) to generate the image data D4 (fourth image data). Correction per frequency component using the first correction value based on the image data D2 of the whole input image realizes appropriate denoising depending on a noise level per frequency component. In consequence, high denoising effect is realized while image degradation is avoided. In comparison with applying a spatial filter multiple times in an effort to improve denoising effect, processing time is reduced, and with no need for a temporal memory for storing intermediate values, circuit size is also reduced. the setting circuit 23 sets the first correction value to the transform value for transforming each frequency component value in the input image so that a ratio among frequency component values in the input image equals to that in the ideal image including no noise. Such first correction value realizes correction to bring the output image close to the ideal image, and thus improves image quality.

In the image processor 1 according to the above embodiment, the setting circuit 24 (correction value setting circuit) sets the per-macroblock scaling matrix SM(MB) (correction value) for correction, on the basis of the per-macroblock activity evaluation value ACT(MB). The per-macroblock correction value based on the per-macroblock activity evaluation value ACT(MB) realizes appropriate correction on a per macroblock basis depending on the attribute of a macroblock. In consequence, denoising effect per block is improved and thus the image quality is improved as a whole. In comparison with applying a spatial filter multiple times in an effort to improve denoising effect, processing time is reduced, and with no need for a temporal memory for storing intermediate values, circuit size is also reduced. The setting circuit 24 holds multiple types of masks depending on the activity evaluation value ACT(MB), the masks containing arbitrary multipliers by frequency components, and sets the correction value to the multiplier for one of the masks corresponding to the activity evaluation value ACT(MB) calculated by the arithmetic circuit 20. In consequence the correction value depending on the per-macroblock activity evaluation value ACT(MB) is obtained simply and appropriately.

While the invention has been described in detail, the foregoing description is in all aspects illustrative and not restrictive. It is understood that numerous other modifications and variations can be devised without departing from the scope of the invention.

What is claimed is:

1. An image processor configured to perform denoising on an input image to generate an outputa the image processor comprising:
    a transform circuit configured to transform first image data of a spatial region extracted from the input image in a unit of a predetermined block into second image data of a frequency region including a plurality of frequency components;
    a first arithmetic circuit configured to calculate a per-block noise value based on the first image data:
    a first quantization value setting circuit configured to set a first quantization value per input image based on a noise value of the whole input image;
    a quantization circuit configured to quantize the second image data based on the first quantization value to generate third image data with noise in the input image removed; and
    an output circuit configured to generate the output image based on the third image data.

2. The image processor according to claim 1, further comprising:
    a correction circuit configured to perform correction per frequency component on the third image data to generate fourth image data, and
    a first correction value setting circuit configured to set a first correction value per input image for correction based on the second image data of the whole input image.

3. The image processor according to claim 2, wherein the first correction value setting circuit is configured to set the first correction value to a transform value for transforming each frequency component value in the input image such that a ratio among frequency component values in the input image equals to that in ideal image including no noise.

4. The image processor according to claim 2, further comprising:
    a second arithmetic circuit configured to calculate a per-block activity evaluation value based on a first image data; and
    a second correction value setting circuit configured to set a per-block second correction value for correction based on the first correction value and the per-block activity evaluation value.

5. The image processor according to claim 4, wherein the second correction value setting circuit is configured to hold a plurality of different masks depending on an activity evaluation value, the masks containing arbitrary multipliers by frequency components, and perform masking on the first correction value using one of the masks corresponding to the activity evaluation value calculated by the second arithmetic circuit to set the second correction value.

6. The image processor according to claim 5, wherein the second correction value setting circuit is configured to set
    the second correction value for a block having a small activity evaluation value to the first correction value for a low-frequency component, while sating the second correction value to substantially zero for middle- and high-frequency components,
    the second correction value for a block having a medium activity evaluation value to the first correction value for low- and middle-frequency components while setting the second correction value to substantially zero for a high-frequency component, and
    the second correction value for a block having a large activity evaluation value to the first correction value for low-, middle-, and high-frequency components.

7. The image processor according to claim 1, further comprising:
    a smoothing circuit configured to calculate a smoothing value of each pixel based on a pixel value of each pixel and a pixel value of a plurality of adjacent pixels,
    the first arithmetic circuit being configured to calculate a sum of absolute difference between a pixel value of each pixel and a smoothing value of each pixel, and calculate an average of the sum of absolute difference in a block as the per-block noise value.

8. The image processor according to claim 1, wherein the first quantization value setting circuit is configured to increase the first quantization value with increase in a noise value.

9. The image processor according to claim 1, further comprising:
   a second arithmetic circuit configured to calculate a per-block activity evaluation value based on first image data; and
   a second quantization value setting circuit configured to set a per-block second quantization value for quantization based on the first quantization value and the per-block activity evaluation value.

10. The image processor according to claim 9, further comprising:
   a smoothing circuit configured to calculate a smoothing value of each pixel based on a pixel value of each pixel and a pixel value of a plurality of adjacent pixels,
   the second arithmetic circuit being configured to calculate a sum of absolute difference between a smoothing value of each pixel and an average smoothing value in a block, and calculate an average of the sum of absolute difference in the block as a per-block activity evaluation value.

11. The image processor according to claim 9, wherein the second quantization value setting circuit is configured to set
   the second quantization value to a quantization value larger than the first quantization value for a block having a small activity evaluation value, and
   the second quantization value to a quantization value smaller than the first quantization value for a block having a large activity evaluation value.

12. The image processor according to claim 1, further comprising:
   a second quantization value setting circuit configured to set a per-block second quantization value for quantization based on the first quantization value and the per-block noise value.

13. The image processor according to claim 12, wherein the second quantization value setting circuit is configured to increase the second quantization value with increase in a noise value with the first quantization value being an upper limit.

14. The image processor according to claim 1, further comprising:
   a determination circuit configured to determine whether denoising is to be performed on the basis of a noise value of the whole input image and an activity evaluation value of the whole input image.

15. The image processor according to claim 14, wherein the determination circuit is configured to divide the noise value of the whole input image by the activity evaluation value of the Whole input image to calculate a noise strength, and determine that denoising is unnecessary if the noise strength is smaller than a predetermined threshold, and that denoising is necessary if the noise strength is larger than or equal to the threshold.

16. The image processor according to claim 1, wherein the transform circuit and the quantization circuit are configured to sequentially process a plurality of blocks extracted from the input image so as to partially overlap each other, and
   output an optimal value obtained from the blocks overlapping each other as image data of a portion of the output image where the blocks overlap each other.

17. The image processor according to claim 1, wherein the transform circuit and the quantization circuit are configured to sequentially process a plurality of blocks extracted from the input image so as to partially overlap each other, and
   use output data of a portion of the output image where the blocks overlap each other in processing a current block for input data of the portion of the image in processing a subsequent macroblock.

* * * * *